United States Patent [19]

Kasahara

[11] Patent Number: 5,157,825
[45] Date of Patent: Oct. 27, 1992

[54] METHOD OF MANUFACTURING A LEAF SPRING MECHANISM

[75] Inventor: Akihiro Kasahara, Kawasaki, Japan

[73] Assignee: Kabushiki Kaisha Toshiba, Kawasaki, Japan

[21] Appl. No.: 557,644

[22] Filed: Jul. 25, 1990

[30] Foreign Application Priority Data

Jul. 25, 1989 [JP] Japan .................................. 1-190531
Aug. 28, 1989 [JP] Japan .................................. 1-218513
Apr. 27, 1990 [JP] Japan .................................. 2-110419

[51] Int. Cl.$^5$ ........................ G02B 7/00; B21F 35/00; B29D 5/00
[52] U.S. Cl. .................................... 29/173; 264/252; 264/261; 264/277
[58] Field of Search .................. 29/173, 418; 267/148, 267/149, 158, 160, 161; 350/245, 247, 255; 369/44.14–44.19; 264/251, 252, 261, 263, 277

[56] References Cited

FOREIGN PATENT DOCUMENTS

| 124043 | 7/1984 | Japan | 369/44.16 |
| 155022 | 8/1985 | Japan | 267/158 |
| 113945 | 5/1988 | Japan | 369/44.15 |
| 173238 | 7/1988 | Japan | 369/44.15 |
| 200324 | 8/1988 | Japan | 369/44.16 |

Primary Examiner—P. W. Echols
Attorney, Agent, or Firm—Oblon, Spivak, McClelland, Maier & Neustadt

[57] ABSTRACT

In a leaf spring mechanism, a pair of triangle leaf spring units are arranged and parallel and reinforcing metal plates are fixed to apex portions of the units. The reinforced apex portions of the units are pinched and molded so that the apex portions are fixed in molded fixing sections. Two of the fixing sections are so fixed to a base as to maintain the one of the fixing sections movable along a direction perpendicular to the surfaces of the units.

6 Claims, 22 Drawing Sheets

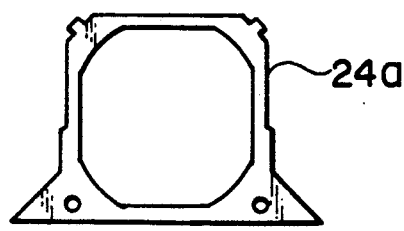
F I G. 8A
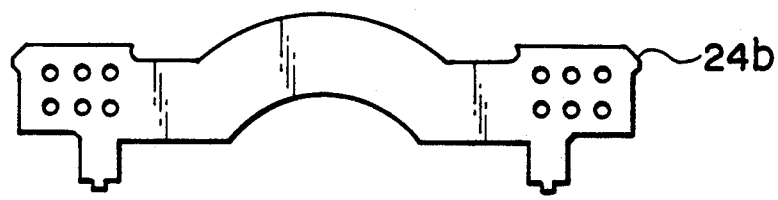
F I G. 8B
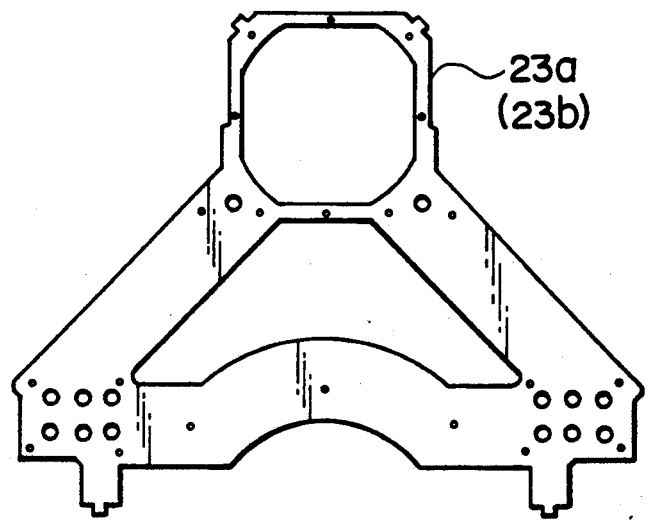
F I G. 8C

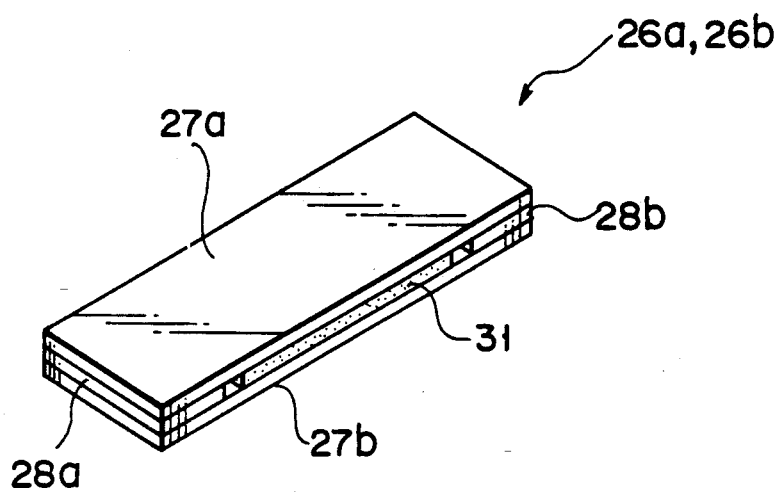
F I G. 12A
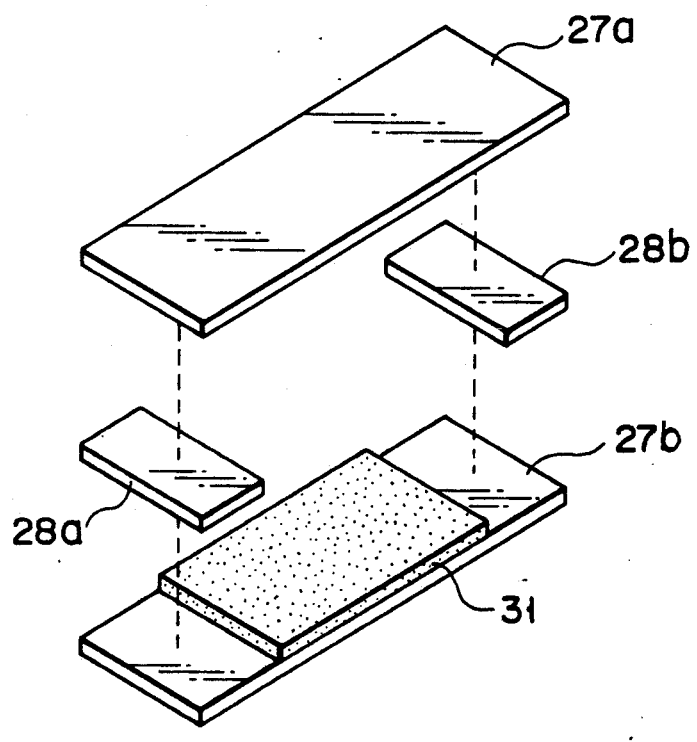
F I G. 12B

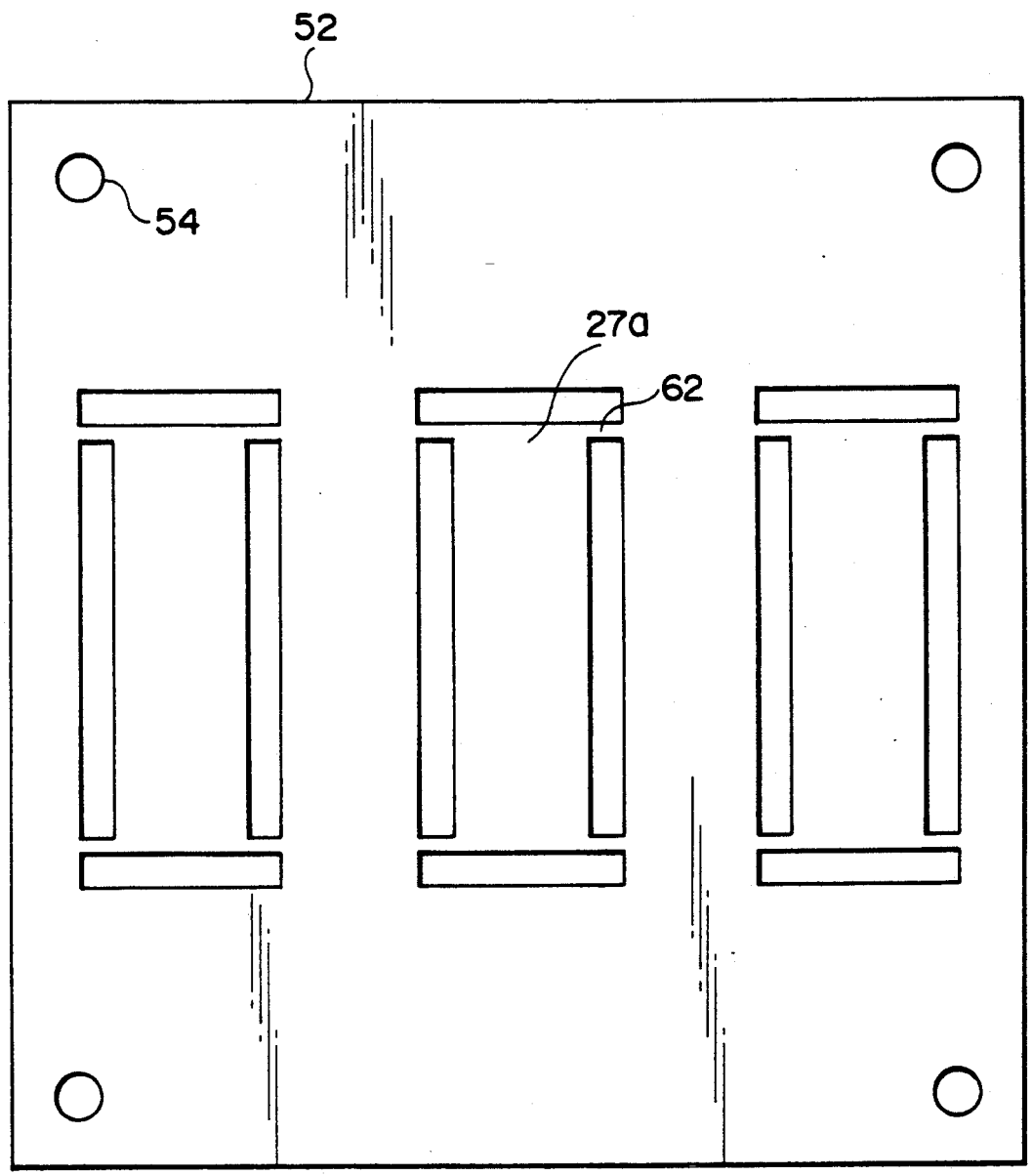
F I G. 14

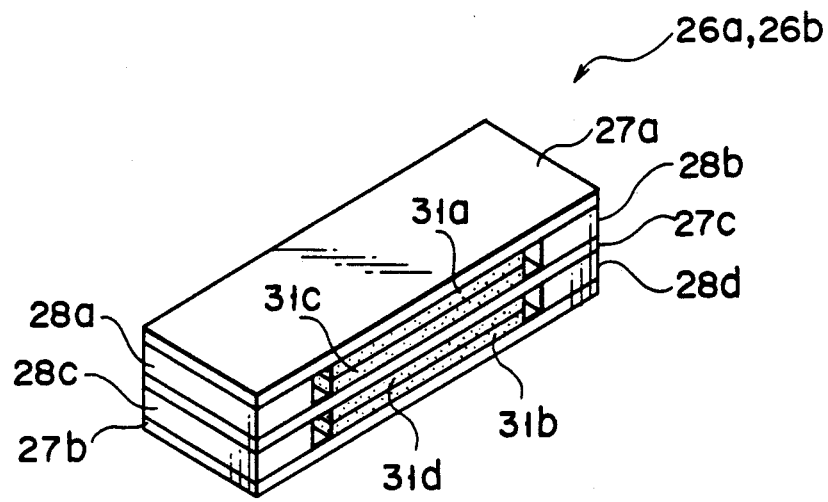
F I G. 18A
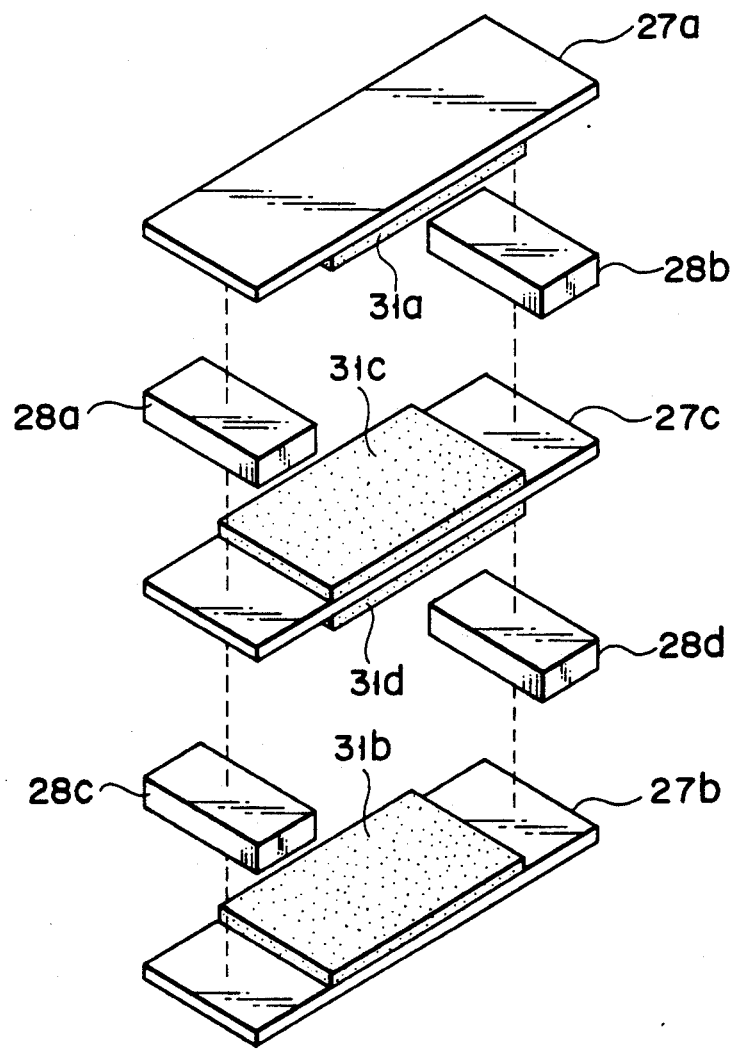
F I G. 18B

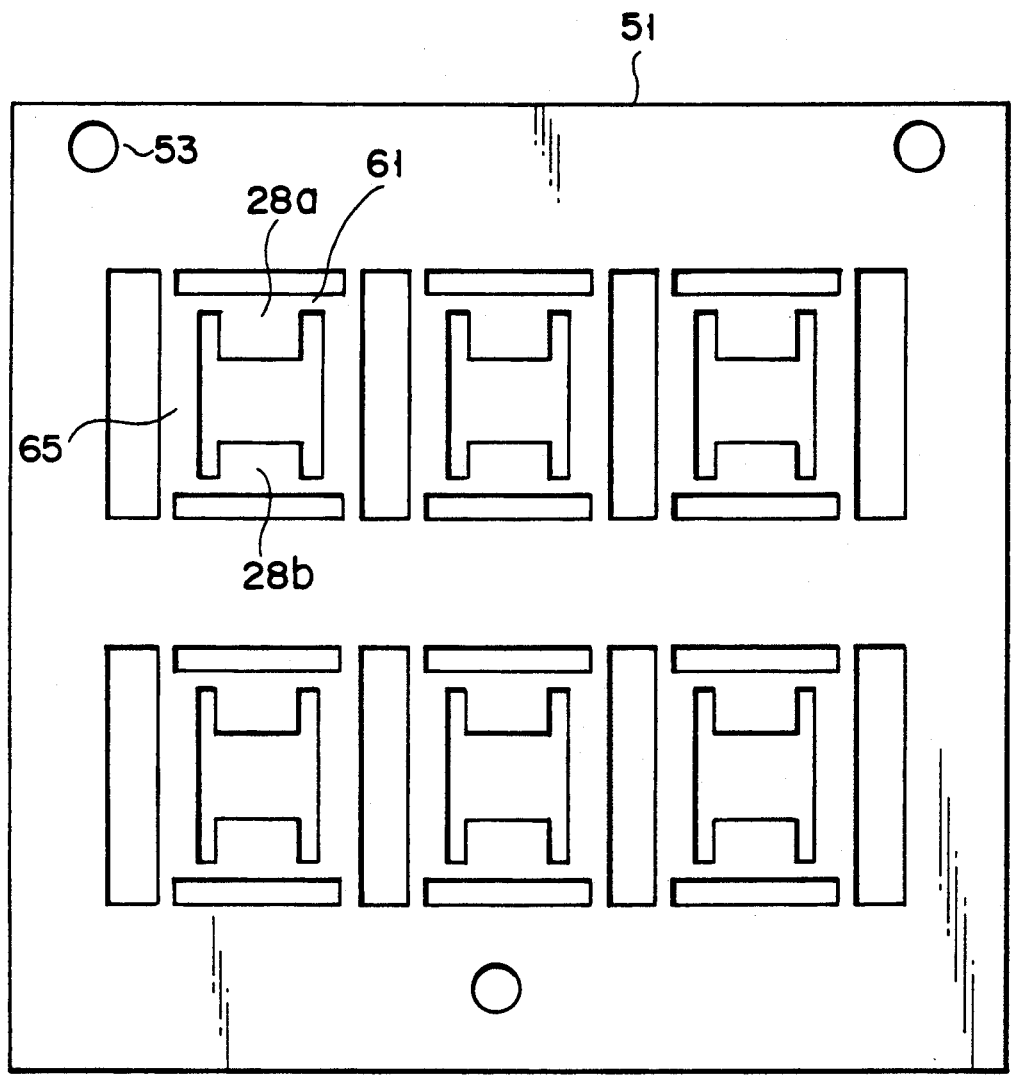
F I G. 21

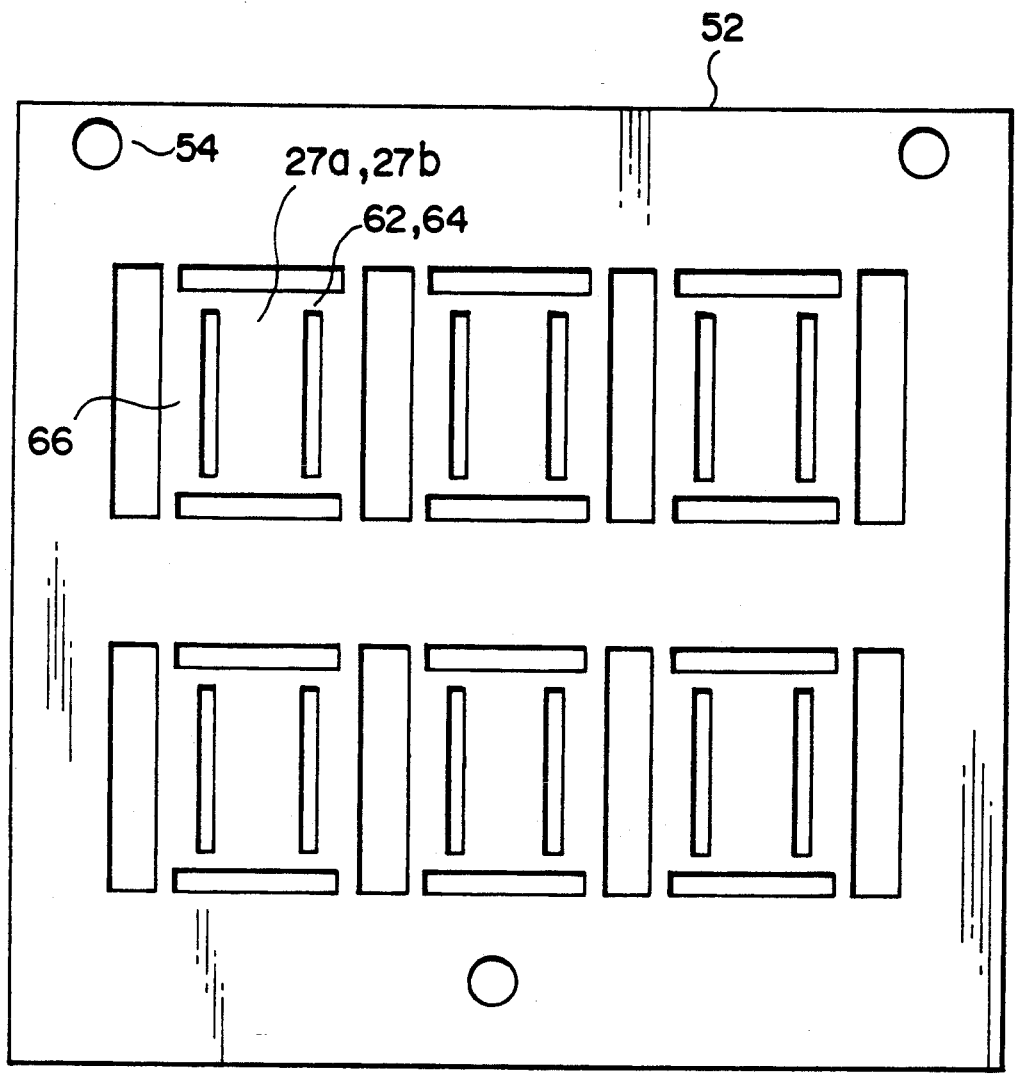
F I G. 22

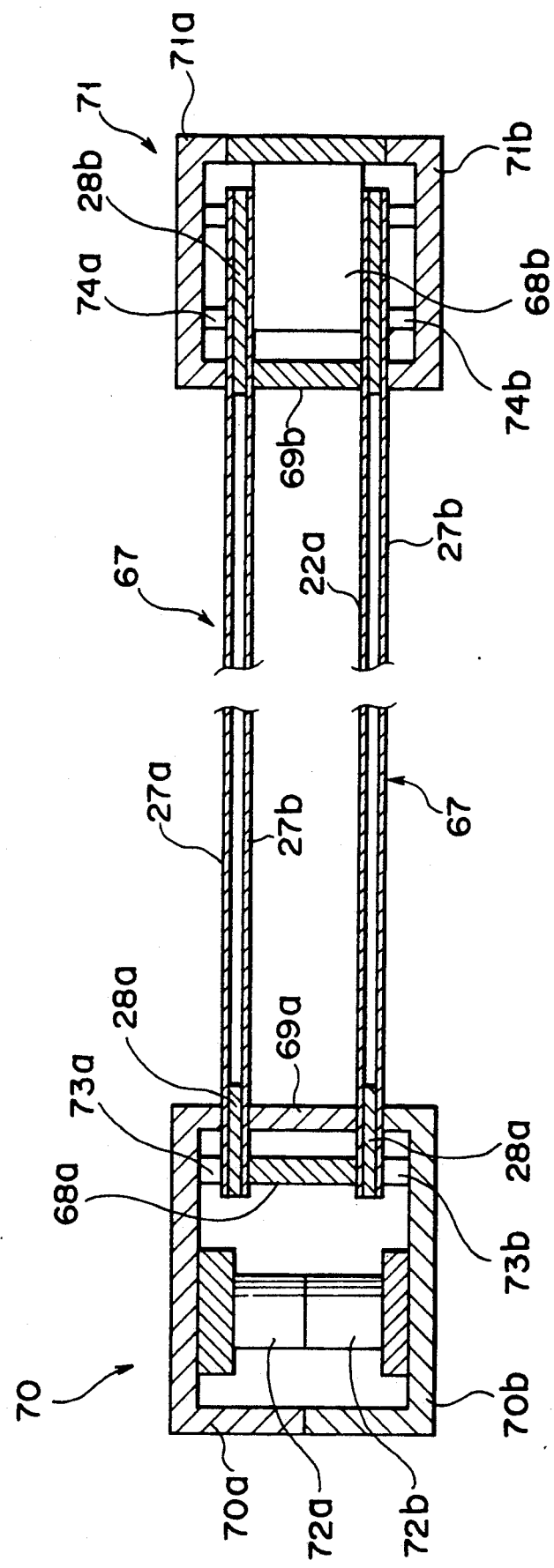
F I G. 25

5,157,825

METHOD OF MANUFACTURING A LEAF SPRING MECHANISM

BACKGROUND OF THE INVENTION

1. Field of the Invention

The present invention relates to a leaf spring mechanism and a method of manufacturing the same and, more particularly, to an objective lens drive device into which the leaf spring system is incorporated.

2. Description of the Related Art

In the case of the leaf spring mechanism for linearly moving an object, two or more leaf springs are arranged substantially parallel to one another and fixedly held at one of their ends while the object to be moved is fixed to their other ends. When the leaf springs curve, the object is moved in a direction perpendicular to the planes of the leaf springs. This leaf spring mechanism is incorporated into the objective lens drive device of the optical system to move the objective lens in the focusing direction. The leaf spring mechanism enables the objective lens to move along its optical axis perpendicular to the surface of the optical disk, that is, in the focusing direction while keeping the optical axis substantially aligned with target information stored on the optical disk. A leaf spring mechanism of this kind is disclosed together with an optical disk system in Japanese Patent Disclosure Sho 61-123030. In the case of this leaf spring mechanism, two leaf springs 101 and 102 shaped like an isosceles triangle are arranged parallel to each other and an objective lens 103 is fixed to an apex of the triangle, as shown in FIG. 1. In the optical disk system into which the leaf spring mechanism is incorporated, the objective lens can be moved at high speed by a small force to gain quick access to the optical disk when the inertia moment of a rotating member 106 is made small while enhancing the vibrating characteristic of the objective lens 103 in focusing and tracking directions 104 and 105.

In order to form the leaf spring mechanism 100 keeping the upper and lower leaf springs 101 and 102 parallel to each other, the leaf springs 101 and 102 which are shaped like an isosceles triangle must be accurately positioned together with an objective lens holder 107 and the rotating member 106 and then molded as a unit to fix the holder 107 to the apex of the isosceles triangle and the rotating member 106 to the bottom side thereof. The leaf spring mechanism will become suitable for mass production when the above-mentioned components can be accurately positioned and then fixed according to the injection molding process. Durable beryllium copper, phosphor bronze, stainless steel or the like is used for the leaf springs 101 and 102 and thermo-setting resin such as plastics is used for the injection molding process in this case.

However, these materials are different in coefficient of thermal expansion and strain is caused during cooling after the injection molding process so as to thereby break the parallel orientation of the leaf springs. The leaf spring mechanism thus made has a moving characteristic in a direction (or curved direction) perpendicular to the planes of the leaf springs to which is nonlinear. In the case where the leaf spring mechanism is incorporated into the optical disk device, resonance frequency in the plane direction of the leaf springs or tracking direction is greatly lowered and a servo-band needed to control the optical disk system cannot be sufficiently wide.

In the case where the leaf spring mechanism is molded according to the injection molding as described above, the parallel orientation of the leaf springs is lost because the material by which the leaf springs are made is different in coefficient of thermal expansion from the other material which is used for the injection molding. Therefore, the leaf spring mechanism thus made has a nonlinear moving characteristic in the curving direction. Further, when the leaf spring mechanism is incorporated into the optical disk system, the resonance frequency in the direction perpendicular to the curving direction, that is, in the tracking direction, is extremely lowered and a servo-band needed to control the optical disk device cannot be sufficiently wide.

SUMMARY OF THE INVENTION

An object of the present invention is therefore to provide a leaf spring mechanism capable of preventing the moving characteristic in the curving direction from becoming non-linear even when it is exposed to thermal expansion at the time of cooling after injection molding.

Another object of the present invention is to provide an objecting lens drive apparatus for the optical disk system which is capable of preventing resonance frequency in the tracking direction from being lowered and making the servo-band wide enough which is needed to control the optical disk system.

According to the invention, there is provided a method of making a leaf spring assembly comprising providing first and second thin metal leaf springs, each having a first and second end, reinforcing the first and second end of each of the first and the second leaf springs; and pinching and molding the reinforced first end and second end of each of the first and the second leaf spring, keeping them parallel.

According to the invention, there is also provided a method of making a leaf spring assembly comprising providing a first thin leaf spring having first and the second end and a first leaf spring sheet having a first extending portion connected to the first and second end of the first thin leaf spring; providing a second thin leaf spring having a first and second end and a second leaf spring sheet having an extending portion connected to the first and second end of the second thin leaf spring; and pinching the first and the second extending portions to hold the first and the second leaf springs parallel to each other and molding the first and second ends of these first and second leaf springs.

According to the invention, there is further provided, a leaf spring mechanism comprising first and second leaf spring units each shaped substantially like a triangle having first, second and third apexes and a hole in the center thereof; first and second connecting members injection-molded to the first and the second apexes to connect the first and the second leaf spring unit substantially parallel; and means for fixing the first and the second connecting member to movably hold the third apex portion in a first direction due to the deformation of the first and the second leaf spring unit.

According to the invention, there is furthermore provided, a leaf spring mechanism comprising first and second leaf spring units each being shaped substantially like a rectangle and having a first and second end respectively reinforced; first and second connecting members injection-molded to the first and second ends to connect the first and the second leaf spring unit substantially parallel; and means for fixing the first and the second connecting member to hold their first ends movably in the first direction due to the deformation of the first and the second leaf spring unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 8A, 8B and 8C are plan views showing components for the leaf spring unit shown in FIG. 7;

FIGS. 12A and 12B show a leaf spring unit for the leaf spring mechanism shown in FIG. 11;

FIGS. 13, 14 and 15 are plan views showing sheet members for making the leaf spring unit shown in FIGS. 12A and 12B;

FIGS. 16A, 16B, 17A, 17B, 18A, 18B, 19A and 19B are perspective views showing variations of the leaf spring unit for the leaf spring mechanism shown in FIG. 11;

FIG. 21 is a plan view showing a reinforcing sheet used to make the leaf spring mechanism shown in FIG. 11;

FIG. 22 is a plan view showing a leaf spring sheet used to make the leaf spring mechanism shown in FIG. 11;

FIG. 25 is a sectional view showing a device for making the leaf spring mechanism shown in FIG. 11.

DESCRIPTION OF THE PREFERRED EMBODIMENTS

Figure 2:
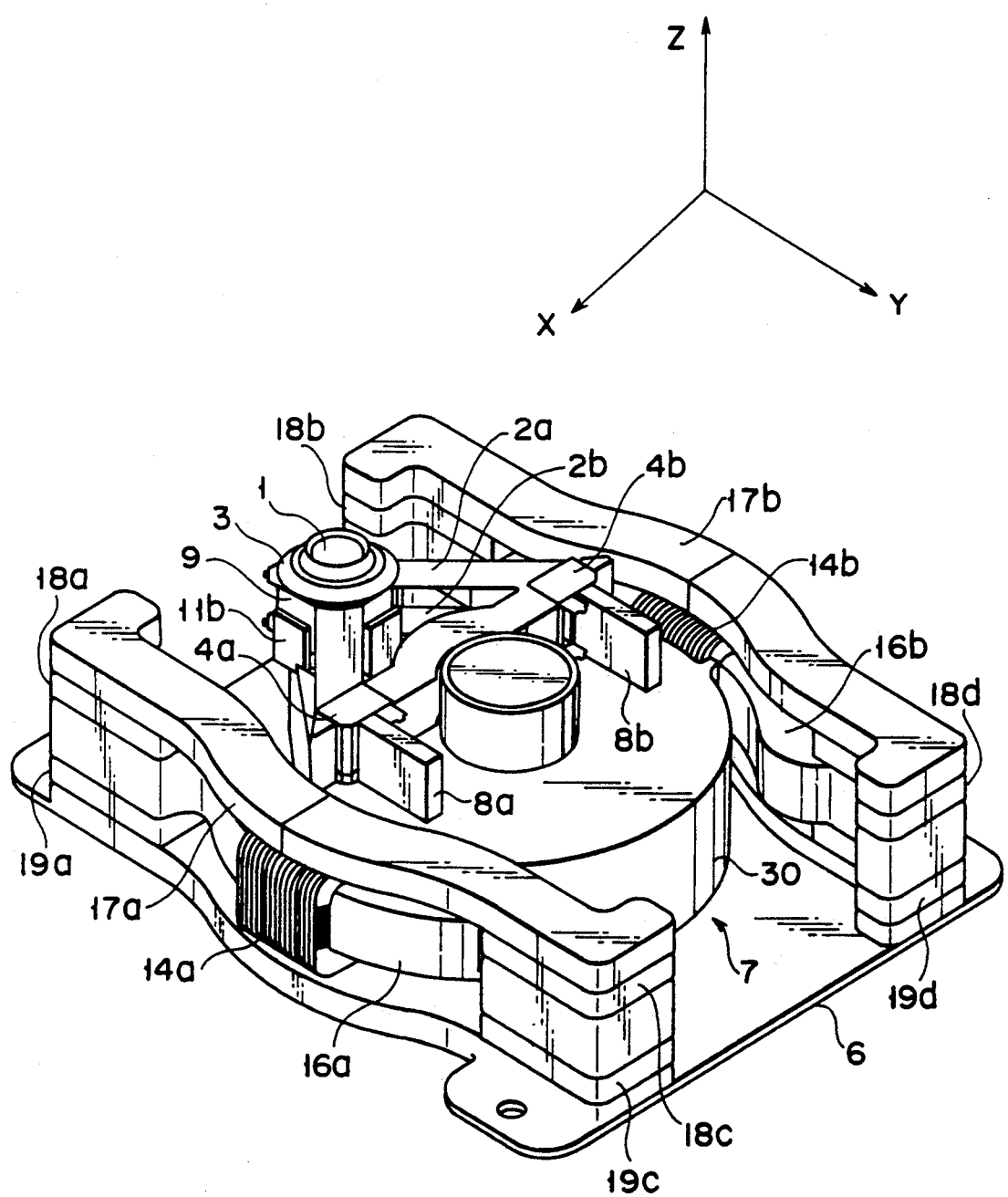
FIGS. 2 and 3 are perspective views showing an optical pickup of the optical disk system wherein a leaf spring mechanism according to the present invention is incorporated into the focusing system.
Figure 3:
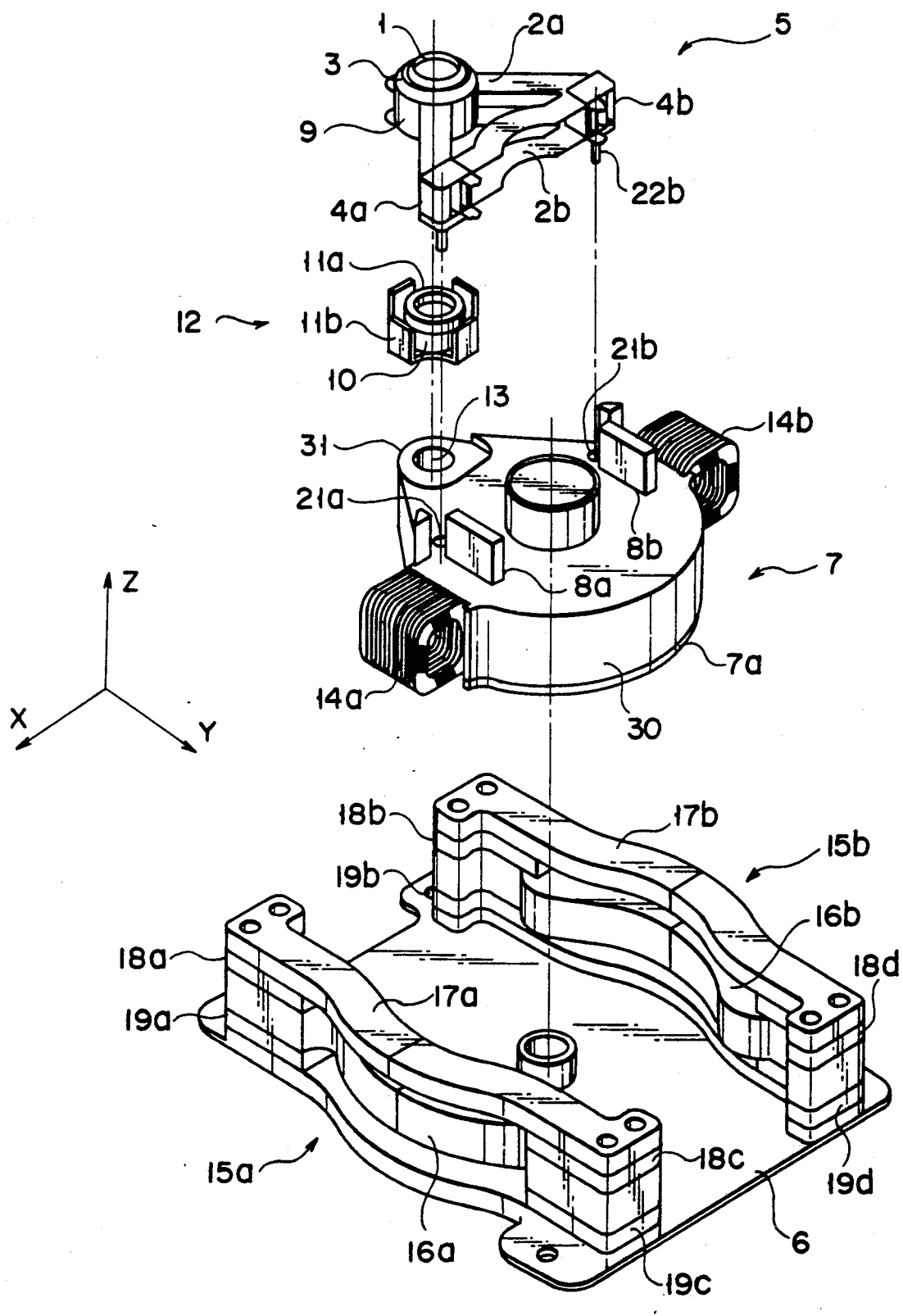

As described above, FIG. 2 is a perspective view showing an optical pickup of the optical disk system wherein a leaf spring mechanism according to the present invention is incorporated into the focusing drive system, and FIG. 3 is a perspective view showing the optical pickup dismantled.

In the case of the optical disk shown in FIGS. 2 and 3, an objective lens 1 for recording and reproducing information onto and out of the optical disk (not shown) through an optical beam is held by a lens holder 3 which is fixed to an apex of a substantially isosceles triangle formed by two leaf springs 2a and 2b. The remaining two apexes of the triangle-shaped leaf springs 2a and 2b have leaf spring fixing sections 4a and 4b and the leaf springs 2a and 2b are made integral to the lens holder 3 and leaf spring fixing sections 4a and 4b as a result of the injection molding. These leaf springs 2a, 2b, lens holder 3 and leaf spring fixing sections 4a, 4b form a leaf spring mechanism 5. The plate spring fixing sections 4a and 4b are equally spaced from the center axis of a rotary drum 7 and fixed on the rotary drum 7, which is rotatable relative to a base 6, with their bosses 22a and 22b fitted into holes 21a and 21b of the drum 7. Further, the leaf spring fixing sections 4a and 4b are bonded or pressure-welded to projections 8a and 8b which extend on the rotary drum 7 in a direction opposite to the leaf spring mechanism 5 on the drum 7. Those faces of the projections 8a and 8b to which the leaf spring fixing sections 4a and 4b are bonded are perpendicular to the tracking or rotating direction of the rotary drum 7.

The rotary drum 7 is shaped like a teardrop comprising an arc section 30 which is shaped like an arc, and a projected section 31 which is shaped like a triangle. The parallel leaf spring mechanism 5 is fixed on the projected section 31. The projections 8a and 8b on the rotary drum 7 are equally spaced from the center axis of the drum 7. The longitudinal direction of these projections 8a and 8b is parallel to a line which passes through centers of the rotary drum 7 and the objective lens 1. As already stated above, the leaf spring fixing sections 4a and 4b are bonded or pressure-welded to the projections 8a and 8b.

The lens holder 3 is made substantially cylindrical and a focusing coil 9 wound similarly like a cylinder is molded in the lens holder 3 to generate magnetic flux along the optical axis. A magnetic circuit 12 comprising a permanent magnet 10 provided with a cylindrical portion and yokes 11a and 11b is arranged in the lens holder 3. The permanent magnet 10 has a magnetic pole magnetized along the optical axis to generate magnetic flux along it. The magnetic circuit 12 is fixed at the front end of the projected portion 31 of the rotary drum 7. The rotary drum 7 is provided at its front end with a hole 13 which serves as a light path, and the magnetic circuit 12 and the lens holder 3 also have hollow portions which cooperate with the hole 13 of the drum 7 to form the light path.

Two tracking coils 14a and 14b are fixed to the side of the rotary drum 7 and they are symmetrical relative to the rotating axis of the drum 7. Each of them is wound round an axis perpendicular to that of the focusing coil 9 to generate magnetic flux in a direction perpendicular to the direction in which the focusing coil 9 generates magnetic flux. Inter-yokes 16a and 16b which form a part of two magnetic circuits 15a and 15b on the base 6 are inserted into the tracking coil 9 without contacting the coil 9. The magnetic circuits 15a and 15b include upper yokes 17a, 17b, permanent magnets 18a–18d, inter-yokes 16a, 16b, permanent magnets 19a–19d, and the base 6 which are stacked one upon the other in this order. Each of the upper and inter-yokes 17a, 17b and 16a, 16b of the magnetic circuits 15a and 15b includes two members connected to each other in the center of the yoke. The permanent magnets 18a-18d and 19a-19d are magnetized in the direction in which they are stacked, and they have magnetic poles alternately reversely magnetized. Each of the magnetic circuits 15a and 15b is shaped like an arc around the rotating axis of the drum 7.

The rotary drum 7 has a space therein in which electrical and optical components and photoelectric converter elements (neither of them are shown) being housed, and the electric components and the photoelectric converter elements are connected to a power source and the like outside through a means such as the flexible substrate. These components and elements can be housed in the rotary drum 7 after a bottom lid 7a is detached from the drum 7.

The inertia moment of the tracking coils 14a and 14b is set so as to be equal to the total inertia moment of the rotary drum 7 and all of the components (except the tracking coils 14a and 14b) driven together with the rotary drum 7. As already described above, those faces of the projections 8a and 8b to which the parallel leaf spring mechanism 5 is connected are determined to be on an XZ plane and the leaf spring fixing sections 4a and 4b are bonded or pressure-welded to the projections 8a and 8b. The case where the leaf spring fixing sections 4a and 4b of the parallel leaf spring mechanism 5 are bonded or pressure-welded to the projections 8a and 8b becomes higher in rigidity upon attaching the leaf spring mechanism 5 to the rotary drum 7, as compared with a case where the leaf spring fixing sections 4a and 4b of the parallel leaf spring mechanism 5 are fixed to the rotary drum 7 only by screws. In the case of using screws, no problem is caused when the moving speed of the movable components is sufficiently low, but when it is made high to shorten the time needed to gain access to a target signal, resonance is caused at the system-attaching area. Since the projections 8a and 8b are located in the vicinity of the center of gravity of the parallel leaf spring mechanism 5 in the direction Z, the rotating force of the drum 7 is transmitted from the direction of force directly to the center of gravity of the parallel leaf spring mechanism 5. In short, no bending moment in the focusing direction of the objective lens 1 occurs but instead only stress in the pulling or compressing direction acts on the parallel leaf spring mechanism 5. The objective lens 1 is thus prevented from vibrating in its focusing direction when the rotary drum 7 rotates in the tracking direction, and resonance frequency at the system-attaching area becomes high so as to realize quick access to target signal.

Figure 4:
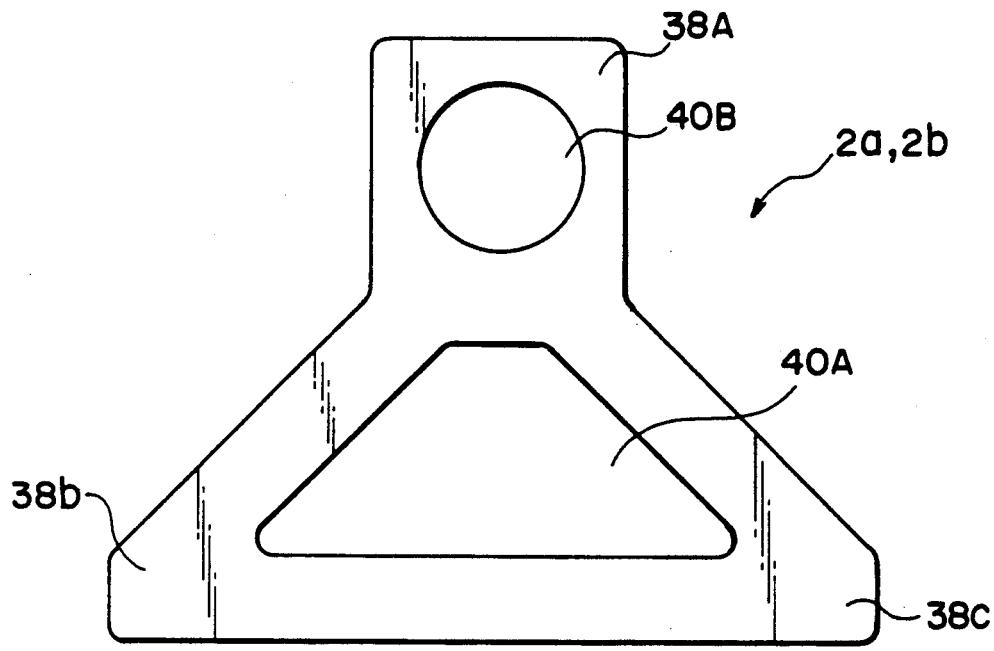
FIGS. 4 and 5 are plan views of a leaf spring assembled into the leaf spring mechanism shown in FIGS. 2 and 3.
Figure 5:
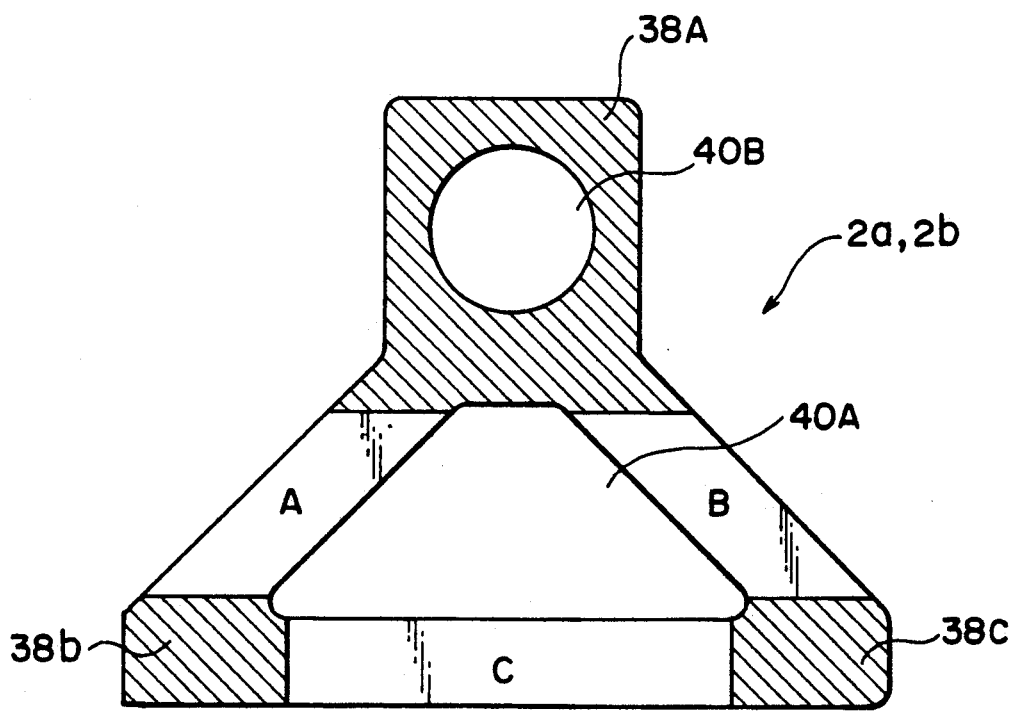

The leaf spring mechanism 5 will be described in detail with reference to FIGS. 4, 5 and 6. FIG. 4 is a plan view showing the leaf springs 2a and 2b for the leaf spring mechanism 5. As shown in FIG. 4, each of the leaf springs 2a and 2b comprises a portion shaped like a substantially isosceles triangle provided with a hole 40A in the center thereof, and another portion 38A shaped substantially like a rectangle provided with hole 40B which defines the optical path. The lens holder 3 is fixed to the portion 38A. Three portions 38A, 38B and 38C to which resin is molded according to the injection molding are shown by the hatched lines in FIG. 5 and the lens holder 3 and the leaf spring fixing sections 4a, 4b are formed at these hatched portions. These hatched portions correspond to apexes of the substantially isosceles triangular leaf springs 2a and 2b, as shown in FIG. 5. The lens holder 3 and the leaf spring fixing sections 4a, 4b are injection-molded in such a way that the two leaf springs 2a and 2b are positioned and held parallel in a die, that the focusing coil 9 is also positioned in the die and that resin is then injected into hollow portions in the die. The leaf spring mechanism 5 thus formed supports the movable components, that is, the lens holder 3 and the objective lens 1 at one apex portion 38A of the triangle and it is fixed to the fixing sections 4a and 4b at the two other apex portions 38B and 38C of the triangle.

Operation of the optical disk device shown in FIGS. 2 and 3 will be described below.

In a case where the objective lens 1 is driven in the focusing direction of the optical disk, current supply to the focusing coil 9 is controlled and the Lorentz force generated by the interaction of magnetic fluxes in a magnetic gap of the magnetic circuit is added to the focusing coil 9. The lens holder 3 is moved by this Lorentz force and the leaf spring mechanism 5 is deformed. Namely, the movement of the lens holder 3 is defined by the leaf spring mechanism 5 and as a result, the objective lens 1 can be moved substantially parallel to its optical axis or in a direction perpendicular to the faces of the leaf springs 2a and 2b by means of the leaf spring mechanism 5. In another case where the objective lens 1 is driven in the tracking direction of the optical disk, current supply to the tracking coils 14a and 14b and Lorentz force generated by the interaction of magnetic fluxes in magnetic gaps of the magnetic circuits 15a and 15b is added to the tracking coils 14a and 14b. When the Lorentz force is applied to the tracking coils 14a and 14b, the drum 7 on which the objective lens 1 is mounted is rotated round the center axis, resulting in moving the objective lens 1.

Figure 1:
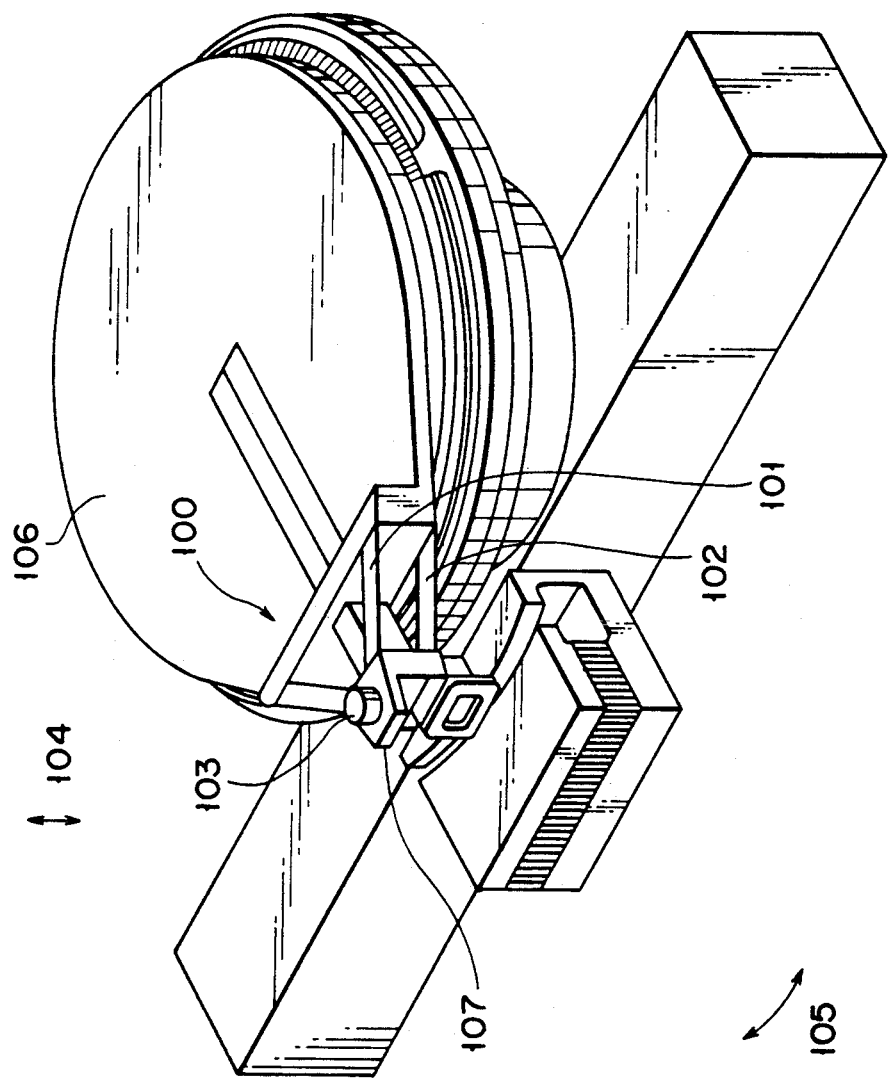
FIG. 1 is a perspective view showing an optical disk system into which a conventional leaf spring mechanism is incorporated.

In the case of the leaf spring mechanism 5, the two leaf spring fixing sections 4a and 4b are connected to each other only by the leaf springs but are virtually separated from each other. Assuming that the sides of each of the leaf springs 2a and 2b be represented by A, B and C as shown in FIG. 5, that side of the conventional leaf spring system shown in FIG. 1 which corresponds to the sides C of the leaf springs 2a and 2b is molded as a unit. In the case of the leaf spring system shown in FIG. 1, therefore, the length of the side C is changed by the strain of the leaf spring system caused when cooled in the course of the molding process, and the other sides A and B are thus inevitably strained to thereby break the parallel orientation of the paired leaf springs. In the case of the leaf spring mechanism 5 shown in FIG. 6, however, all of the sides A, B and C serve as the virtual spring sections of the leaf springs 2a and 2b but even when strain is caused at the molded portions of the mechanism 5 in the course of the cooling process after the injection molding, the length of each of the sides is not changed by the strain because these sides are not molded. In addition, the angles formed by the sides A, B and C can remain constant and the strain does not influence the sides. The two leaf springs 2a and 2b can be thus held accurately parallel and the curving characteristic of the leaf spring mechanism 5 can be prevented from becoming non-linear. Resonance frequency in the tracking direction of the optical disk device can thus be prevented from becoming low and a servo-band needed to control the optical disk system can be held sufficiently accordingly.

Figure 9B:
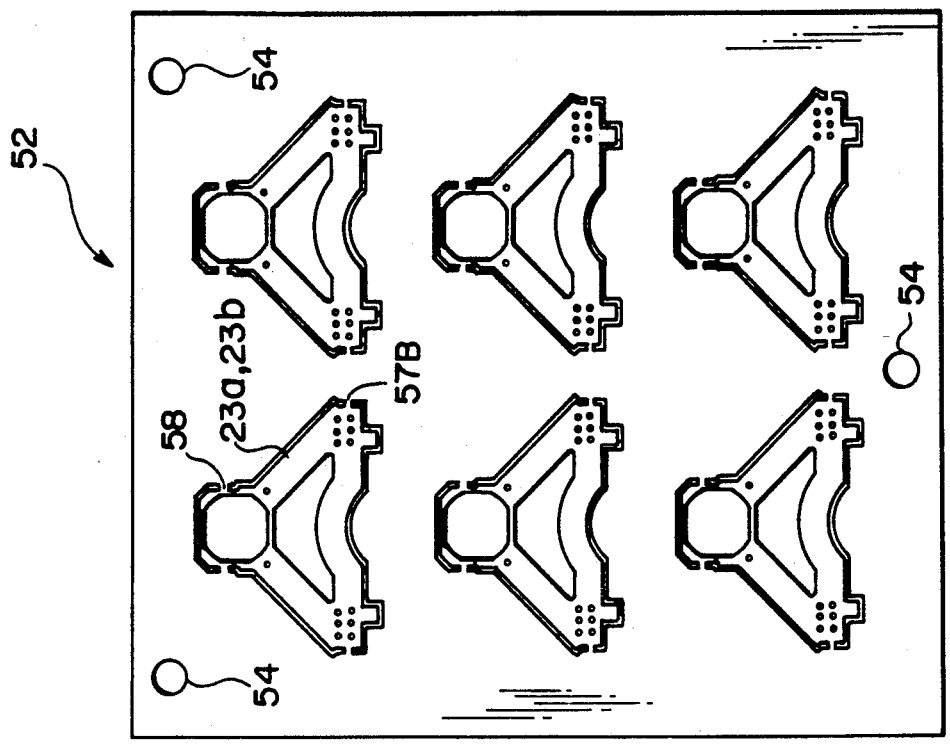
FIGS. 9A and 9B are plan views showing sheet members for making the leaf spring unit shown in FIG. 7.
Figure 9A:
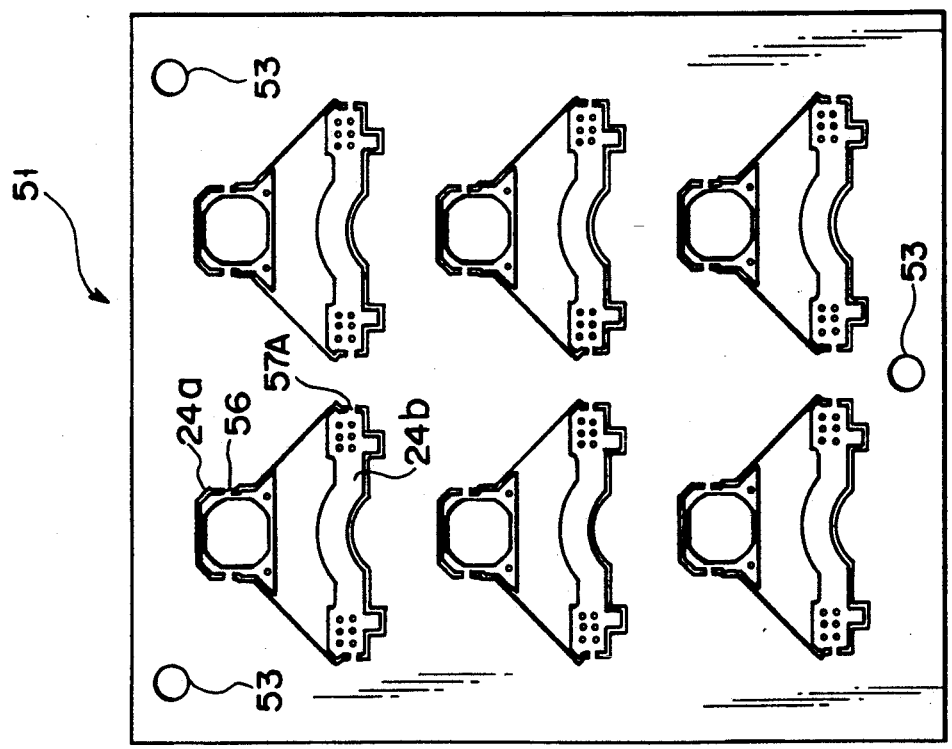
Figure 10A:
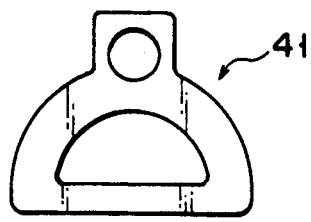
FIGS. 10A through 10I are plan views showing leaf springs having various kinds of shapes to form the leaf spring mechanism shown in FIG. 6.
Figure 10B:
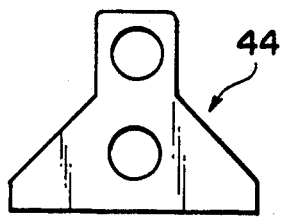
Figure 10C:
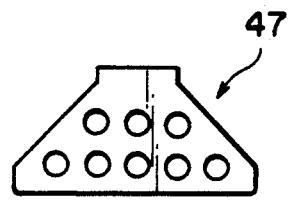
Figure 10D:
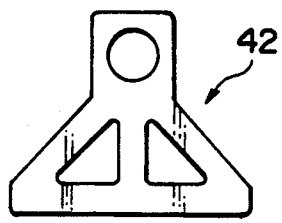
Figure 10E:
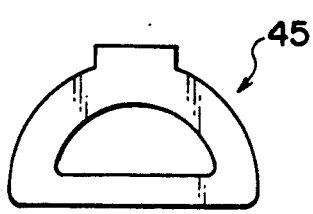
Figure 10F:
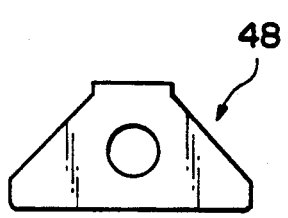
Figure 10G:
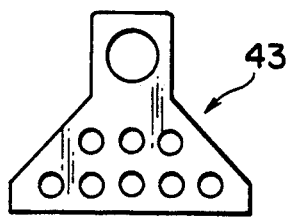
Figure 10H:
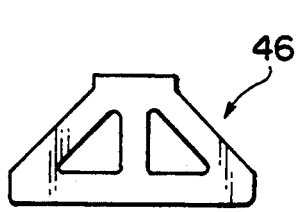
Figure 10I:
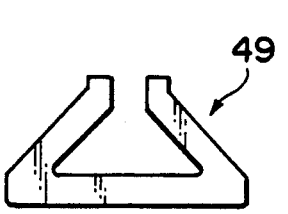

Variations of the parallel leaf spring mechanism 5 according to the present invention will be described in detail with reference to FIGS. 7 through 9B. FIG. 7 is a perspective view showing a variation of the leaf spring unit according to the present invention. The leaf spring unit shown in FIG. 7 is enlarged in its thickness direction for the clarity of explanation. In the case of the leaf spring unit shown in FIG. 7, a pair of leaf spring members 23a and 23b are made integral with reinforcing plates 24a and 24b interposed between them. Two of these leaf spring units are arranged parallel and fixed as a result of the injection molding. The parallel leaf spring mechanism 5 shown in FIG. 6 is thus made. The leaf spring members 23a, 23b and the reinforcing plates 24a, 24b are shaped as shown in FIGS. 8A, 8B and 8C and the reinforcing plates 24a and 24b are mounted on the leaf spring member 23a. As shown in FIGS. 9A and 9B, the leaf spring members 23a, 23b and the reinforcing plates 24a, 24b are cut off from stainless steel sheets 51 and 52 but are connected at their points 56, 57A, 57B and 58 to the sheets according to the etching process or like processes used. The sheet 51 was 20–40 μm thick and the sheet 52 about 15 thick in this case. Each of the sheets 51 and 52 has three positioning holes 53 or 54.

When the leaf spring unit is to be made, the sheets 52 are piled one upon the other with the sheet 51 sandwiched between them, inserting pins of a jig (not shown) through the positioning holes 53 and 54 of the sheets to accurately position the leaf spring members 23a, 23b and the reinforcing plates 24a, 24b. The leaf spring members 23a, 23b and the reinforcing plates 24a, 24b are then connected to one another by spot or laser welding or bonding or pressure-welding process. They were connected in this case by spot welding them at 21 points as shown in FIG. 8C. The leaf spring units are then cut off from the sheets 51 and 52 at their points 56, 57 and 58. Force is added to the sheets 51 and 52 to position the leaf spring members 23a, 23b and the reinforcing plates 24a, 24b, but these leaf spring members 23a, 23b and reinforcing plates 24a, 24b themselves receive no force. Each of the leaf spring units thus completed has no strain and it is excellent in terms of flatness characteristic. Further, the interval between the leaf spring members 23a and 23b is defined by the thickness of the reinforcing plates 24a and 24b. This enables the leaf spring members 23a and 23b to have a high degree of parallel orientation between them.

The leaf spring unit made according to the above-described process is molded at its portions (which will be hereinafter referred to as reinforced portions A and B) reinforced by the reinforcing plates 24a and 24b in the course of the injection molding. When the parallel leaf spring mechanism 5 is to be made by the leaf springs 2a and 2b according to the injection molding, the reinforced portions A and B to which the injection molding is applied are thick enough. In addition, the leaf springs 2a and 2b are not deformed by pressure at the time of the injection molding. Therefore, the leaf springs 2a and 2b held parallel in the die do not lose their parallel orientation even when resin (or thermoplastic resin) flows into the die at the time of the injection molding. When the parallel leaf spring mechanism 5 is used for the objective lens drive apparatus shown in FIG. 2, the objective lens 1 can be accurately driven in the focusing direction. A plurality of holes in the leaf spring members 23a, 23b and the reinforcing plates 24a, 24b allow resin to flow into necessary areas in the die in the injection molding process and also enhance the strength of connecting the resin to the leaf springs.

Generally, the flexural rigidity of a material is proportional to the cube of its thickness and the shearing strength thereof is proportional to its sectional area. In the case where the leaf spring unit is formed by the plural leaf spring members 23a, 23b and one or more reinforcing plates 24a, 24b as described above, the ratio of the shearing strength relative to the flexural rigidity of the leaf spring unit can be made large. The leaf spring unit of a laminated structure which includes a plurality of leaf springs has a higher rigidity than that of a single leaf spring in the radial direction, even if the leaf spring unit has the same rigidity as that of the single leaf spring in the focusing direction. The rigidity in the focusing direction is determined based on a requirement of the focusing control. In the optical disk apparatus, it is necessary in achieving an effective focusing control that a primary inherent resonance of the leaf spring unit is set to be 60 Hz, when the optical disk is rotated at 3000 r.p.m. Therefore, a control band in the radial direction can be set wide to thereby enable radial behavior to be conducted with a higher accuracy.

The reinforced portion B may be formed only at those portions of the parallel leaf spring system to which the leaf spring fixing sections 4a and 4b are molded. In the case of this example, however, the reinforced portion B is formed along that portion which corresponds to one side of a triangle (or a bottom side of the isosceles triangle) to reduce the number of the reinforced plates used. Even when the parallel leaf spring mechanism 5 is handled holding the leaf spring fixing sections 4a and 4b sandwiched between fingers, deformation such as buckling is not caused at one side of the triangle and the other two sides of the triangle which serve as spring portions are not deformed accordingly so that no damage occurs to the spring portion. Each of the spring portions which is formed by the two parallel leaf springs 2a and 2b is not filled with the reinforcing plate but is instead left hollow in the case of this example. These hollow portions between the two parallel leaf springs 2a and 2b may be filled with a visco-elastic material such as silicone rubber. A stainless steel sheet is piled on another sheet, pieces of the viscoelastic material are then placed on the spring portions and a sheet 25b is placed on them. These three sheets are then welded to one another and the leaf spring systems are cut off from these piled sheets. When the leaf spring unit having the viscoelastic material filled between the parallel leaf springs 2a and 2b is used, the peak of resonance in resonance frequency in the direction perpendicular to the plane direction can be lowered to allow the optical disk device to be controlled with a higher degree of accuracy. The leaf spring unit in which the visco-elastic material is used will be described later.

The present invention is not limited to the above-described embodiments. Even when leaf springs 41–49 variously shaped and provided with various kinds of holes, as shown in FIGS. 10A through 10I, for example, are used and fixing members are injection-molded with an interval interposed between them as seen in the case of the leaf spring fixing sections 4a and 4b, the same merits as already mentioned above can be expected. The leaf spring mechanism may be formed by combining these leaf springs 41–49 variously.

The number of the leaf springs used to form the leaf spring mechanism of the present invention is not limited to two but three, four or more leaf springs may be used. The leaf spring system may be provided with three or more connecting members. The leaf spring mechanism is suitable for use with the optical disk device but it may be applied to other devices.

As described above, the leaf spring mechanism of the present invention can prevent its moving characteristic in the curving direction from becoming non-linear even when it is under the influence of thermal expansion at the time of cooling after the injection molding process. In the case of the optical disk system into which the leaf spring mechanism is incorporated, a servo-band needed to control the optical disk system can be held sufficiently without lowering the resonance frequency in the tracking direction of the disk system.

Figure 11:
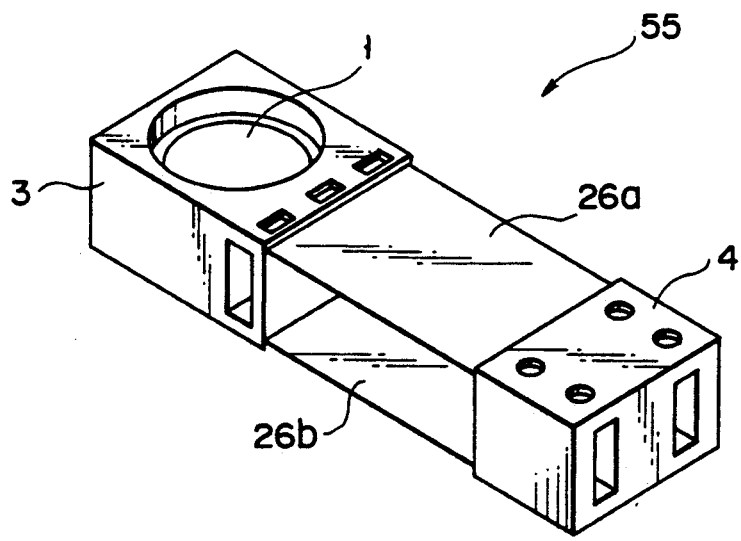
FIG. 11 is a perspective view showing another example of the leaf spring mechanism according to the present invention.

The parallel leaf spring system which is used for the objective lens drive device is not limited to the one shown in FIG. 7, but a leaf spring mechanism having an arrangement shown in FIG. 11 may be used. This leaf spring mechanism will be described referring to FIGS. 11 through 20C.

The same components of a parallel leaf spring mechanism 55 shown in FIG. 11 as those shown in FIGS. 2 and 3 will be represented by same reference numerals and a description of these components will be omitted. Leaf springs 26a and 26b used for the parallel leaf spring mechanism 55 may have the various kinds of arrangements shown in FIGS. 12A through 16.

Figure 13:
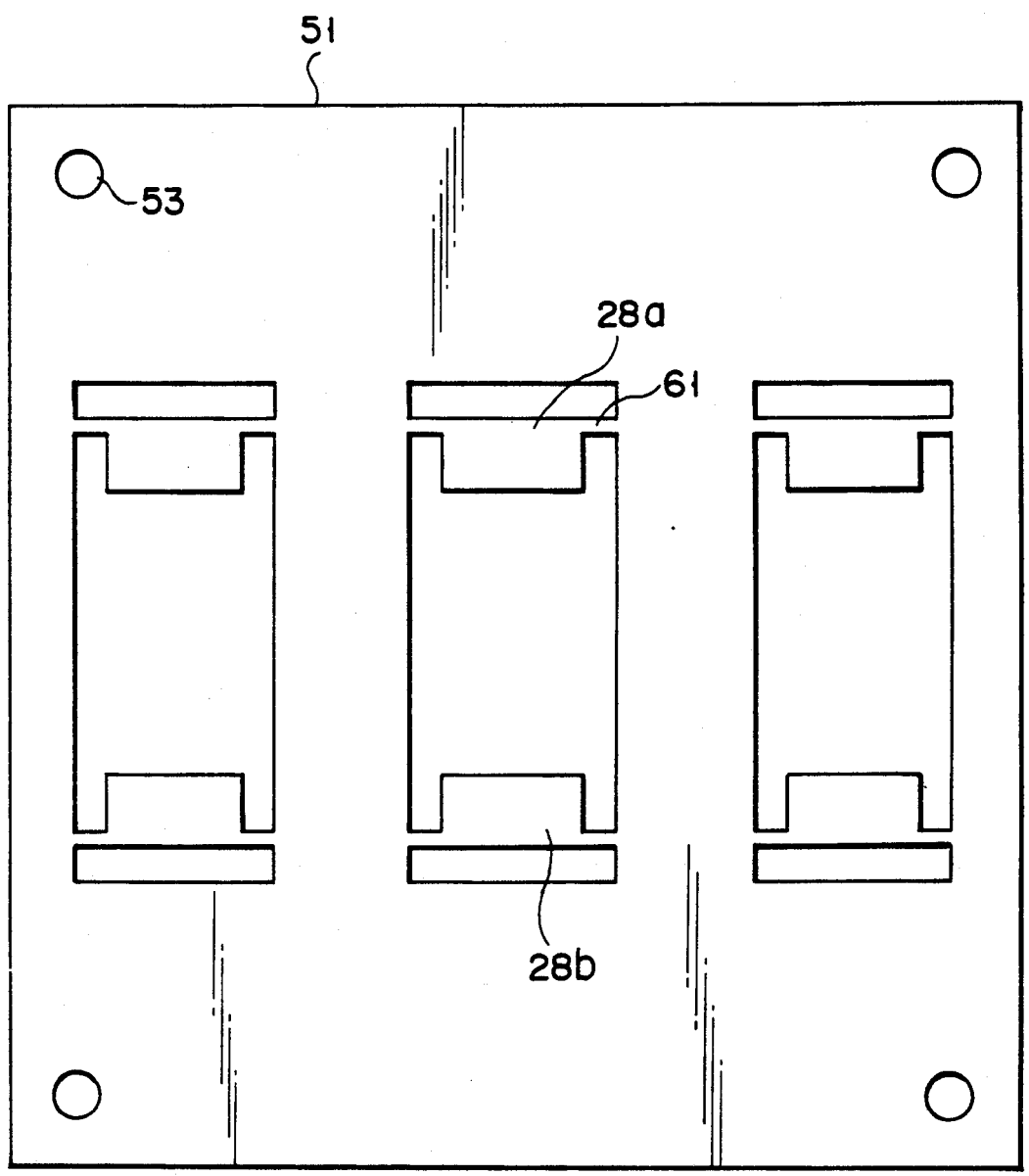
Figure 15:
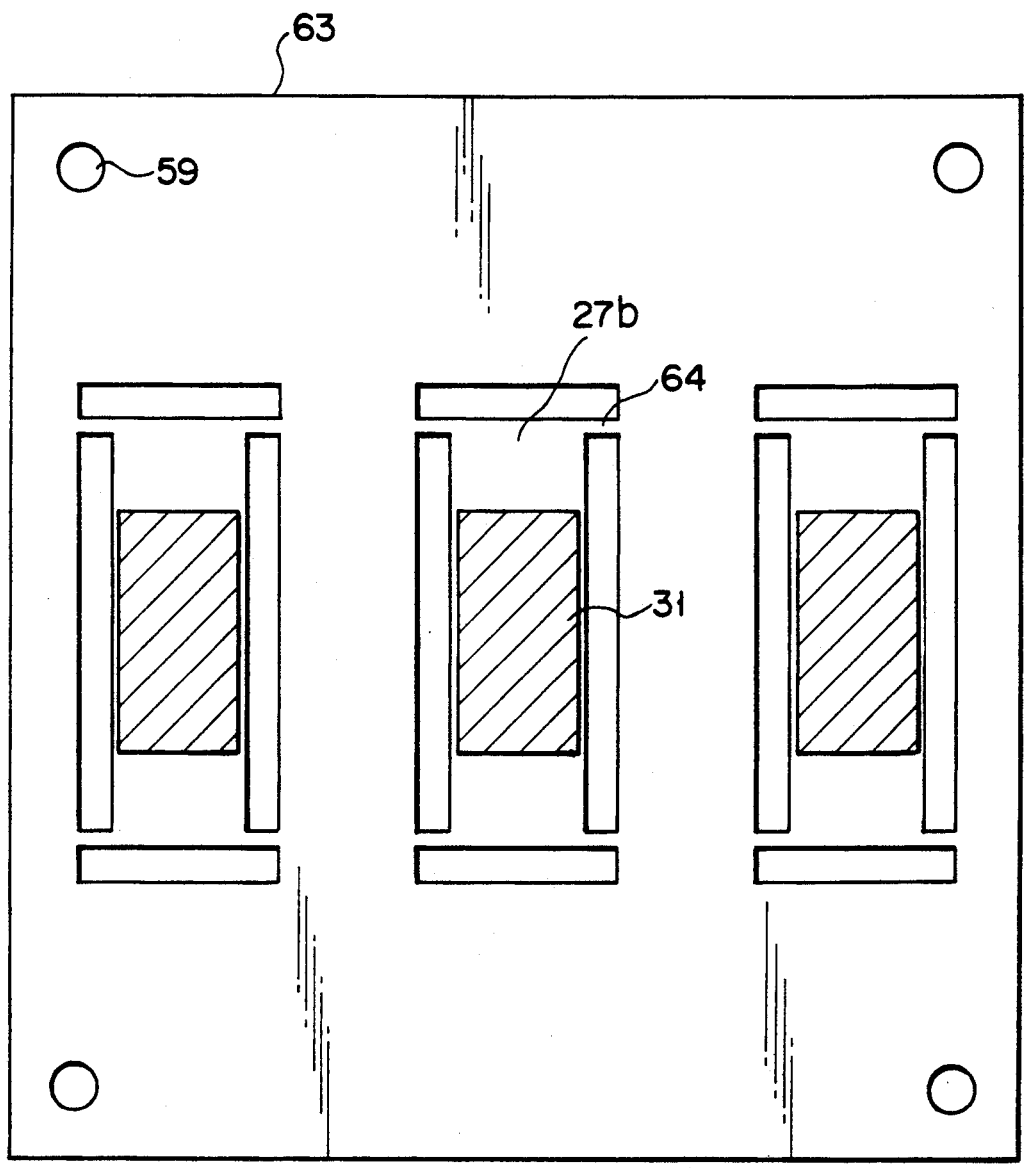

In the case of the leaf springs 26a and 26b shown in FIGS. 12A and 12B, viscoelastic matter 31 such as silicone gel and rubber whose damping characteristic and hardness do not change as temperature changes occur in a hollow region between two parallel leaf springs, 27a and 27b. The viscoelastic matter 31 has the same thickness as that of each of the reinforcing plates 28a and 28b. The leaf springs 26a or 26b shown in FIG. 12A are used to form a unit as follows. Leaf spring members 27 and reinforcing plates 28 are cut off from stainless steel sheets 51 and 52 according to the etching process or the like but are connected to the sheets at their portions 61 and 62, as shown in FIGS. 13 and 14. The viscoelastic matter 31 is coated on a sheet 63 which is the same in size as the sheet 51, as shown in FIG. 15. The sheets 51, 52 and the sheet 63 on which the viscoelastic matter 31 is coated are stacked one upon the other, positioned using holes 53, 54 and 59 of the sheets and welded as a unit by spot, laser or pressure welding, or bonding. The leaf 26 are released from the sheets, cutting off their connecting portions 61, 62 and 64 from the sheets (the connecting portions 61, 62 and 64 shown in FIGS. 13, 14 and 15 are drawn larger than the virtual ones).

The viscoelastic matter 31 may be coated on the sheet, hardened and then overlapped with the other sheet, or it may be coated on the sheet, overlapped with the other sheet and then hardened. The damping characteristic was better in the case of this example than when the latter method was employed.

Figure 16A:
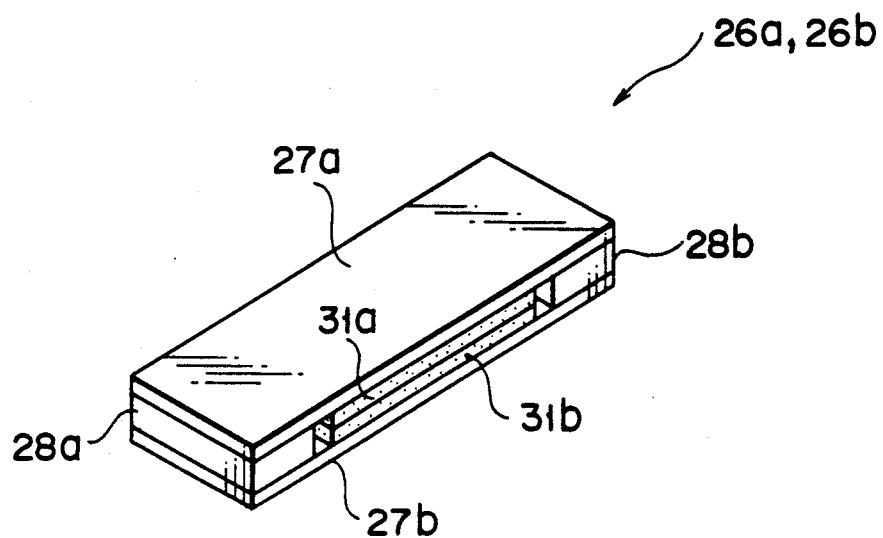
Figure 16B:
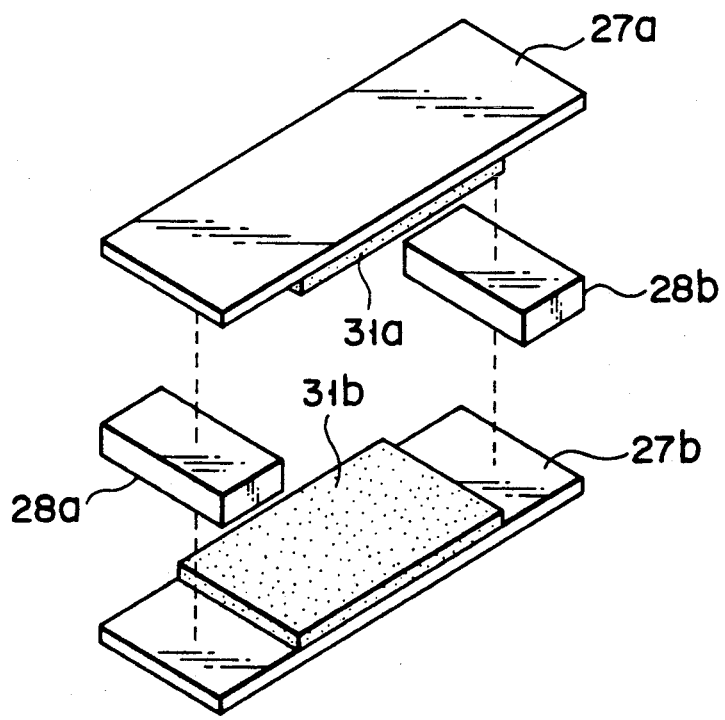

A unit of leaf springs 26a or 26b shown in FIGS. 16A and 16B is made through substantially the same process as in the case of the leaf spring unit shown in FIGS. 12A and 12B, but the thickness of each of the reinforcing plates 28a and 28b is different from that of each of the ones shown in FIGS. 12A and 12B. The viscoelastic matters 31a and 31b are previously coated on both of leaf spring members 27a and 27b according to the silk printing, coating or bonding and they are welded as a unit as shown in FIG. 15. The thickness of the reinforcing plate 28 is made substantially equal to the total thickness of the viscoelastic matters 31a and 31b. According to this example, a large resonance suppressing effect can be expected similarly to the case of the already-described example. In addition, the number of processes steps required can be reduced because the same members can be welded to form the leaf spring unit.

Figure 17A:
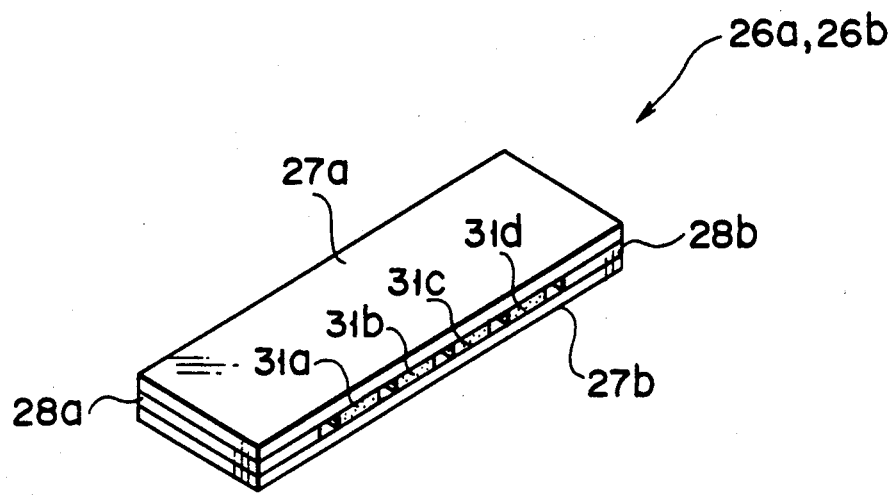
Figure 17B:
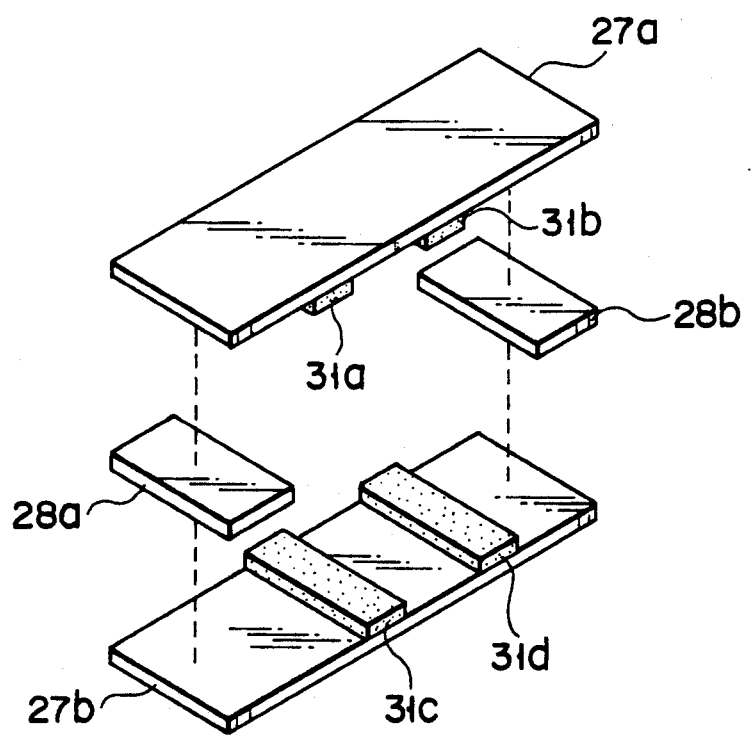

A unit of leaf springs 26a or 26b shown in FIGS. 17A and 17B is made through substantially the same process as in the case of the two above-described examples, but the arrangement of the viscoelastic matter 31 is different from those in the two above-described examples. As shown in FIGS. 17A and 17B, viscoelastic matters 31a, 31b, 31c and 31d are coated on both of the leaf springs 27a and 27b with a certain interval interposed between the adjacent viscoelastic matters, and the leaf springs 27a and 27b are welded as a unit, alternating the viscoelastic materials between them. The thickness of each of the reinforcing plates 28a and 28b is substantially equal to that of each of the viscoelastic matters 31a, 31b, 31c and 31d. According to this example, a large resonance suppressing effect can be expected similarly to the case of the already-described examples. In addition, the number of process steps required can be reduced because the leaf spring unit can be made by welding the same members.

Figure 18A:
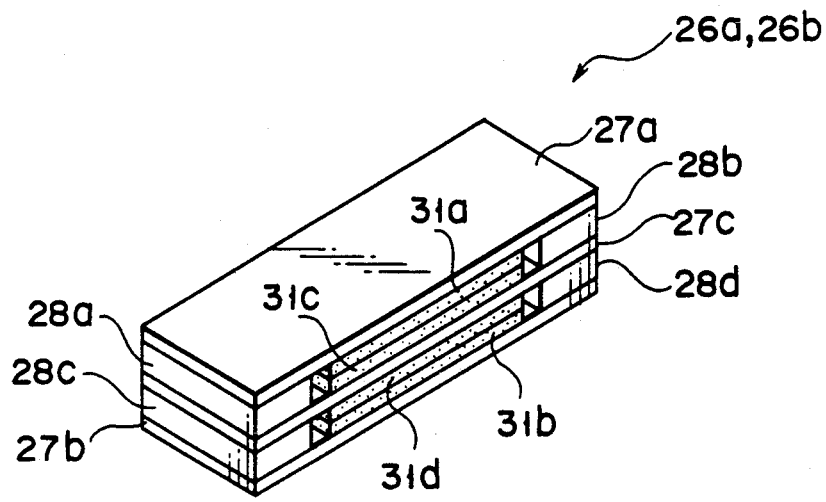
Figure 18B:
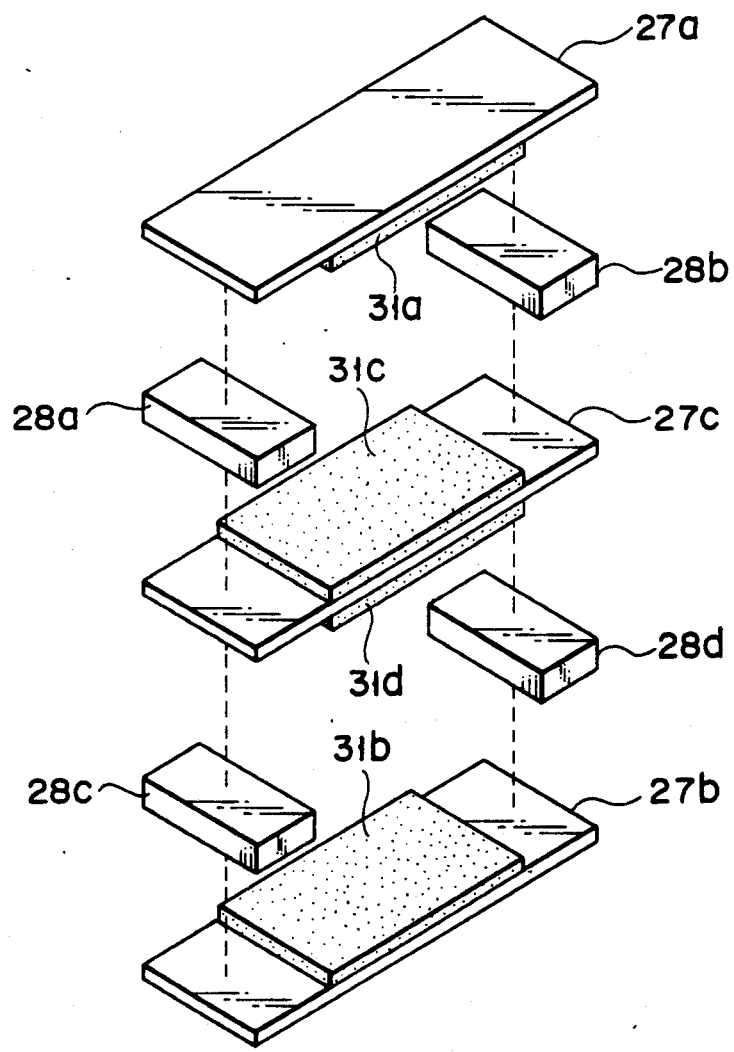

A unit of leaf springs 26a or 26b shown in FIGS. 18A and 18B has a laminating arrangement. The visco-elastic matter 31a or 31b is previously coated on one side of each of the leaf springs 27a and 27b according to the silk printing, coating or bonding process and viscoelastic matters 31c and 31d are previously coated on both sides of a leaf spring 27c according to the silk printing, coating or bonding process. These leaf springs 27a, 27b and 27c are welded as a unit, as shown in FIG. 18A. The thickness of each of the reinforcing plates 28a, 28b, 28c and 28d is made substantially equal to the total thicknesses of the viscoelastic matters 31a and 31c, or 31d and 31b.

The leaf spring unit may be made without using the viscoelastic matter. As shown in FIGS. 20A through 20D, for example, various kinds of leaf spring units comprising leaf springs 27a-27c and reinforcing plates 28a-28f can be made according to any one of the methods already mentioned above. The same merits as those of the first example can be achieved using one of these leaf spring units. The number of leaf springs laminated is not limited to those shown in FIGS. 20A through 20D but as it becomes larger, the durability of the leaf spring unit against injection pressure becomes higher. At the same time, the ratio of shearing rigidity relative to the flexure rigidity of the leaf spring unit becomes larger. Therefore, the optical axis of the objective lens is not tilted. In addition, resonance frequency in the radial direction becomes higher and the control band becomes wider. This enables highly accurate radial behavior to be achieved.

Figure 20C:
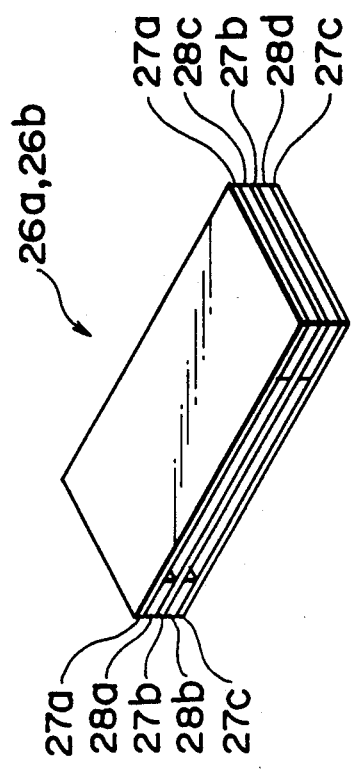
FIGS. 20A through 20D are perspective views showing variations of the leaf spring unit for the leaf spring mechanism shown in FIG. 11.
Figure 20D:
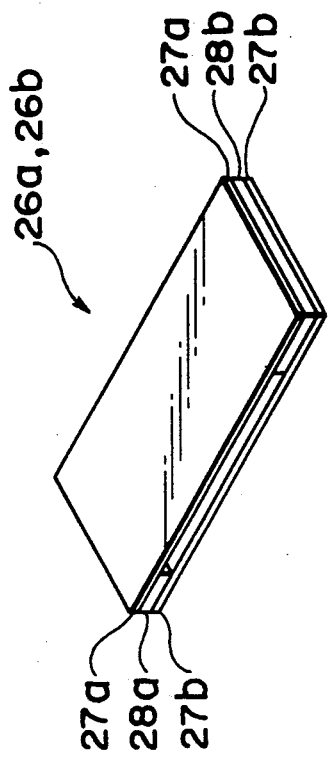
Figure 20A:
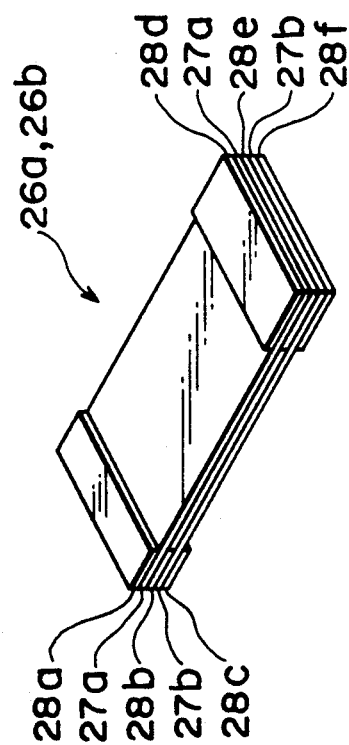
Figure 20B:
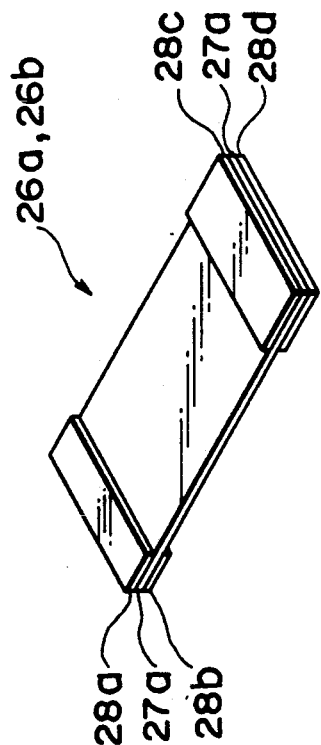

The unit of leaf springs 26a or 26b shown in FIG. 20B has no laminated arrangement but has the following advantage. In the case of this unit of leaf springs 26a or 26b, reinforcing plates 28a-28d are those portions to which resin is virtually fixed at the time of injection molding, and no resin is contacted directly with the leaf spring member 27a. Therefore, the burrs of resin do not contact the leaf spring 27a and the deforming characteristic of the leaf spring 27a which is the virtual movable portion can be thus kept certain. This enables a parallel leaf spring system whose characteristic is usually kept constant to be provided. The same merits can be expected relating to the unit of leaf springs 26a or 26b shown in FIG. 20A. As for the other examples, the same merits can be expected when the reinforcing plates 28 are fixed to the surface of the unit of leaf springs 26a or 26b.

Figures 23A, 23B:
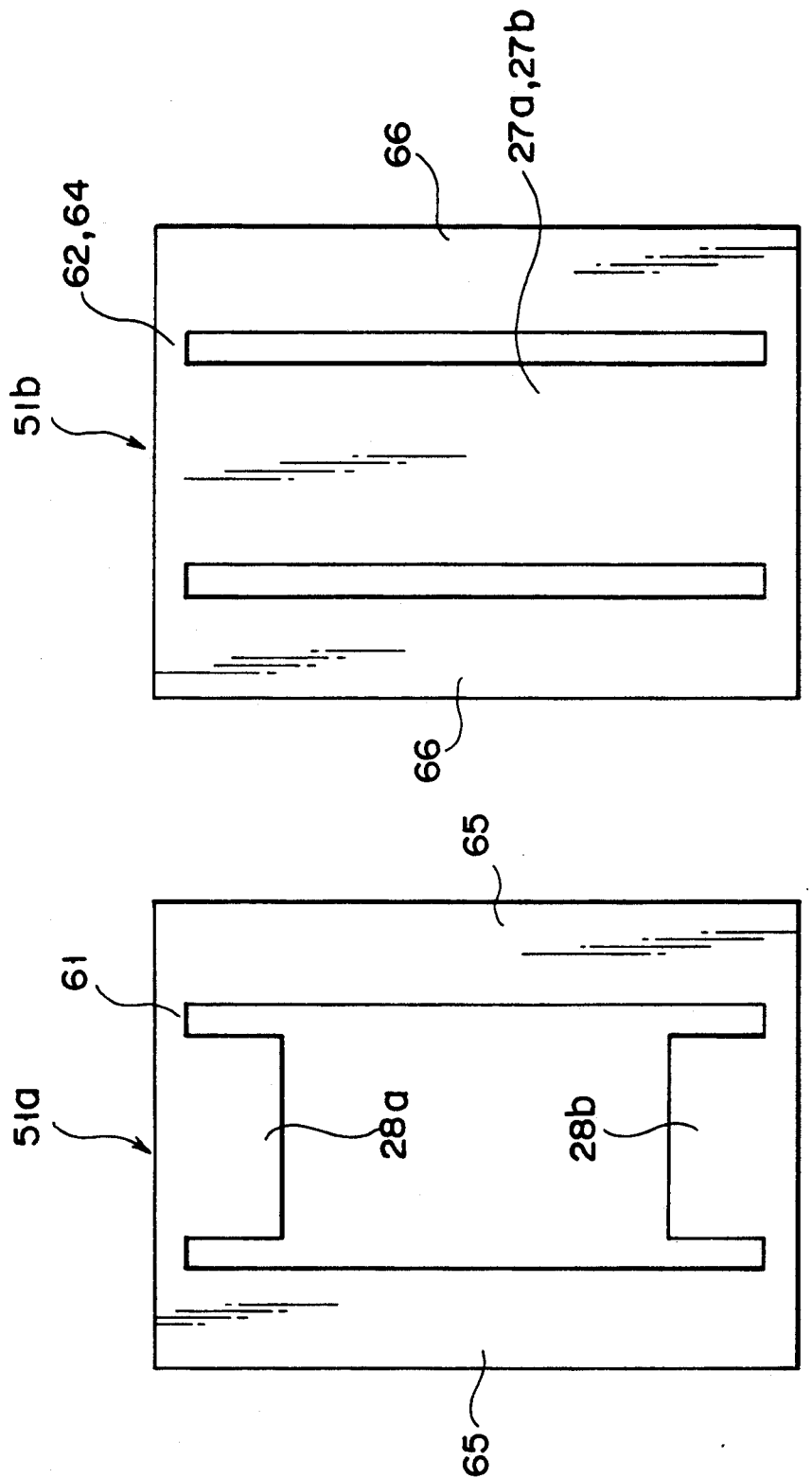
FIGS. 23A and 23B are plan views showing sheet segments for the leaf spring mechanism shown in FIG. 11.
Figure 24:
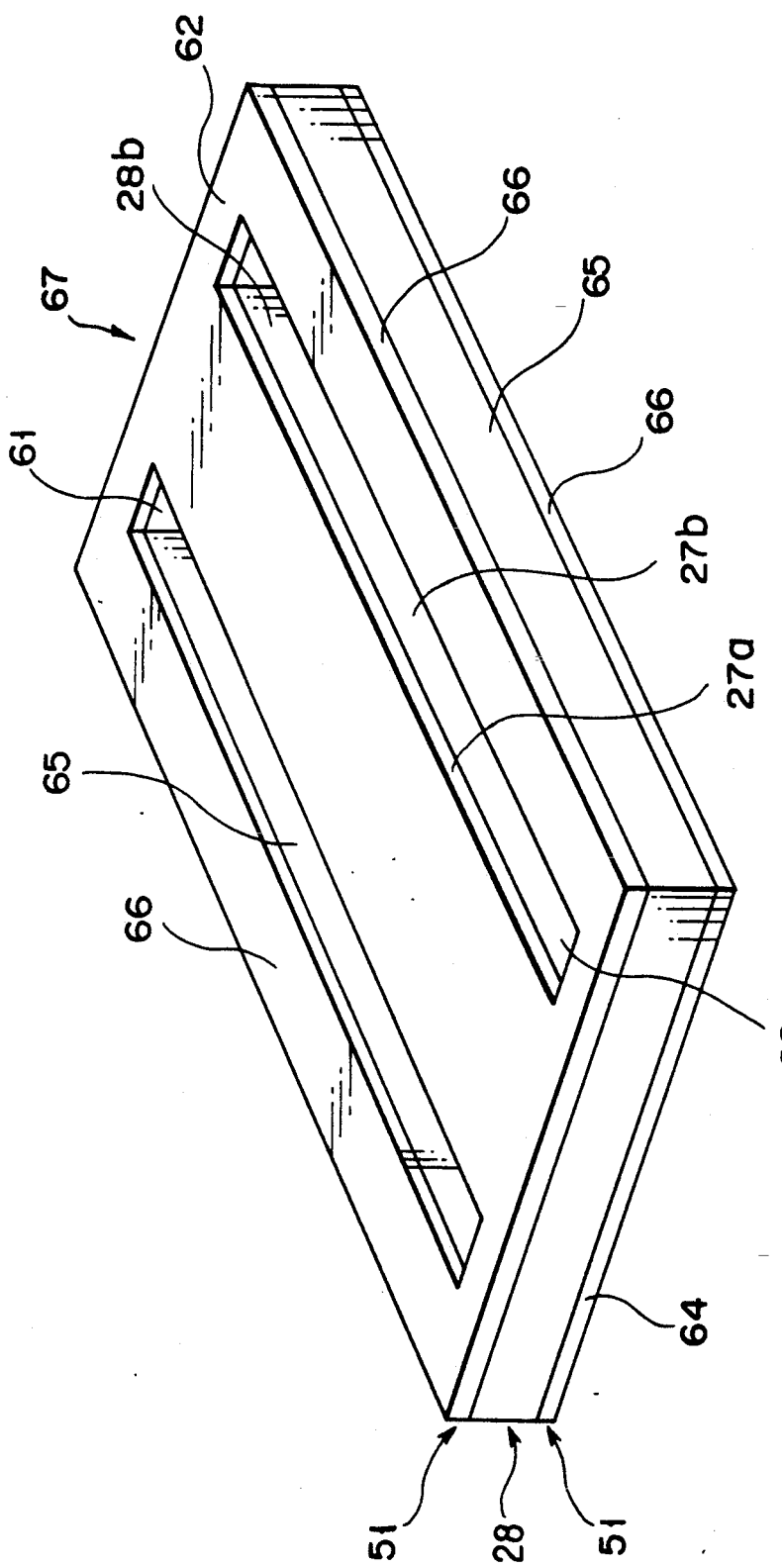
FIG. 24 is a perspective view showing a leaf spring unit made by the sheet segments shown in FIGS. 23A and 23B.

A method of making the leaf spring mechanism 55 shown in FIG. 11 will now be described with reference to FIGS. 21 through 25. As seen in FIGS. 13, 14 and 15, the leaf springs 27a, 27b and the reinforcing plates 28a, 28b are formed from sheets 51 and 52 according to the die cutting or etching process but connecting to the sheets at their portions 61, 62 and 64, as shown in FIGS. 21 and 22. The reinforcing plate sheet 51 is 10–1000 μm thick and the leaf spring sheet 52 is 15–40 μm thick. A reinforcing portion 65 is further provided between the connecting portions 61 on the sheet 51 on which the reinforcing plates 28a and 28b are formed. Another similar reinforcing portion 66 is provided between the connecting portions 62 or 64 on the sheet 52 on which the leaf springs 27a and 27b are formed. Rods of a positioning jig (not shown) are inserted into holes 54, 53 and 54 of the sheets 52, 51 and 52 and these sheets 51 and 52 are aligned with the sheet 51 interposed between the sheets 52. The reinforcing plates 28a and 28b, leaf springs 27a and 27b and reinforcing portions 65 and 66 are then connected to each other by welding or bonding process. Sheet segments 51a and 51b shown in FIGS. 23A and 23B are formed while the sheets 51 and 52 are welded and frame members 67 each of which corresponds to the one unit of leaf springs 26a or 26b are provided as shown in FIG. 24. In the case of each of the frame members 67, the leaf springs 27a and 27b are fixed to the reinforcing plates 28a and 28b, extending parallel to each other, as already described above. A pair of the frame members 67 shown in FIG. 24 are assembled to form a leaf spring mechanism. As shown in FIG. 25, sliders 68a, 68b and frameworks 69a, 69b are located between those reinforced portions of the paired frame members 67 which are reinforced by the reinforcing plates 28a and 28b, and these frame members 67 are arranged in first and second frames 70 and 71 at both end potions thereof. The first frame 70 comprises two segments 70a and 70b. A space in which the lens holder 3 is housed is provided in the first frame 70 and the segments 70a and 70b are provided with cylindrical projections 72a and 72b to form a through-hole in the lens holder 3 which serves as an optical path. The segments 70a and 70b are also provided with projections 73a and 73b to pinch those reinforced portions of the paired frame members 67 which are reinforced by the reinforcing plates 28a. Similarly, the second frame 71 comprises two segments 71a and 71b and a space in which the fixing sections 4 are housed is provided in the second frame 71. Further, the segments 71a and 71b are provided with projections 74a and 74b to pinch those reinforced portions of the paired frame members 67 which are reinforced by the reinforcing plates 28b.

When the segments 70a and 70b of the first frame 70 are contacted with each other as shown in FIG. 25, the projections 72a and 72b are also contacted with each other and those reinforced portions of the paired frame members 67 which are reinforced by the reinforcing plates 28a are pinched between the slider 68a and the projection 73a and between the slider 68a and the projection 73b, respectively. The reinforced portions of the paired frame members 67 are thus fixed in the frame 70. Similarly, when the segments 71a and 71b of the second frame 71 are contacted with each other, those reinforced portions of the paired frame members 67 which are reinforced by the reinforcing plates 28b are pinched between the slider 68b and the projection 74a and between the slider 68b and the projection 74b, respectively. The other reinforced portions of the paired frame members 67 are thus fixed in the second frame 71. Reinforced portions 65 and 66 of the frame member 67 are also pinched at this time by a pinch system (not shown) and the paired frame members 67 are thus kept parallel to each other and held unmovable. Molding matter is injected into the frames, keeping the frame members held therein, and the lens holder 3 and the fixing sections 4 at which the paired frame members 67 is fixed are thus formed. A laser beam is applied to the connecting portions 61, 62 and 64 to cut off the leaf spring system 55. The leaf spring mechanism shown in FIG. 11 is thus completed.

When the paired frame members 67 are formed, as shown in FIG. 24 according to the above-described method, they are reinforced by the reinforcing sheet 28 which is provided with the reinforcing portions 28a, 28b and 65. This prevents the leaf springs 27a and 27b from becoming deformed. Further, the frame members 67 pinched at portions which are reinforced by the reinforcing sheet 28 and resin is molded to these reinforced portions at the time of the molding process. Therefore, the leaf springs 27a and 27b are not strained by pressure at the pinching process and by pressure added to the frame member 67 when molded resin expands and contracts. This prevents the leaf springs from becoming deformed. Furthermore, the leaf spring system 55 is cut off from the sheet segment by a laser beam and this prevents any external force from being added to the leaf springs to deform them.

Figure 6:
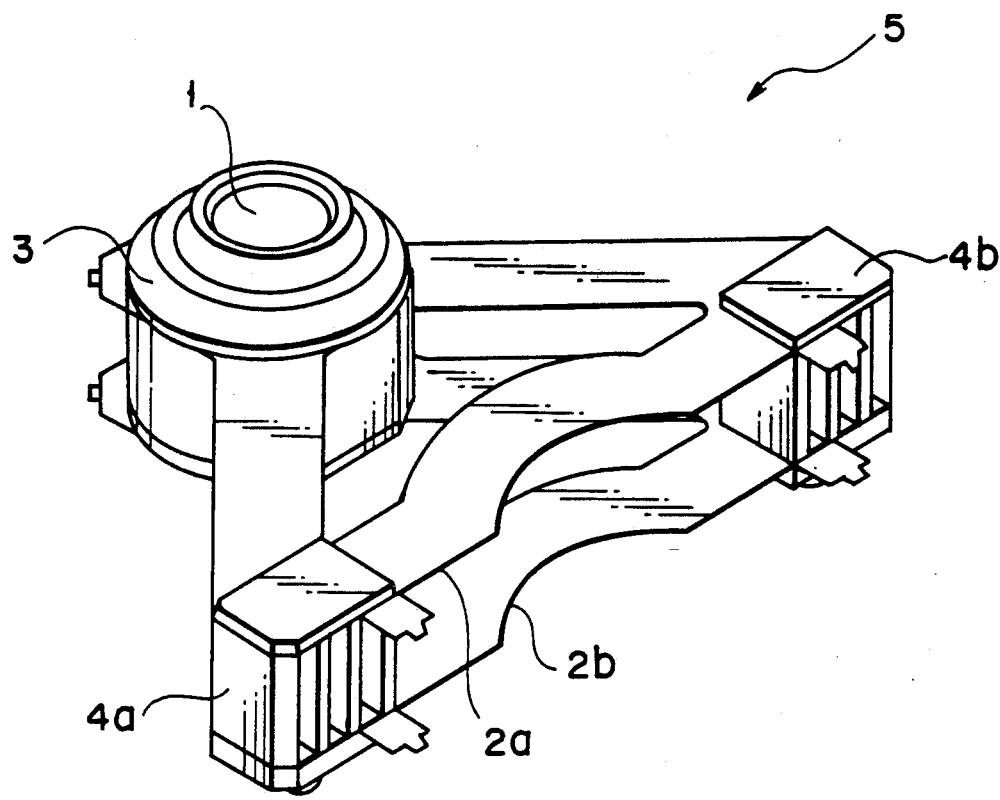
FIG. 6 is a perspective view showing the leaf spring mechanism shown in FIGS. 2 and 3.
Figure 7:
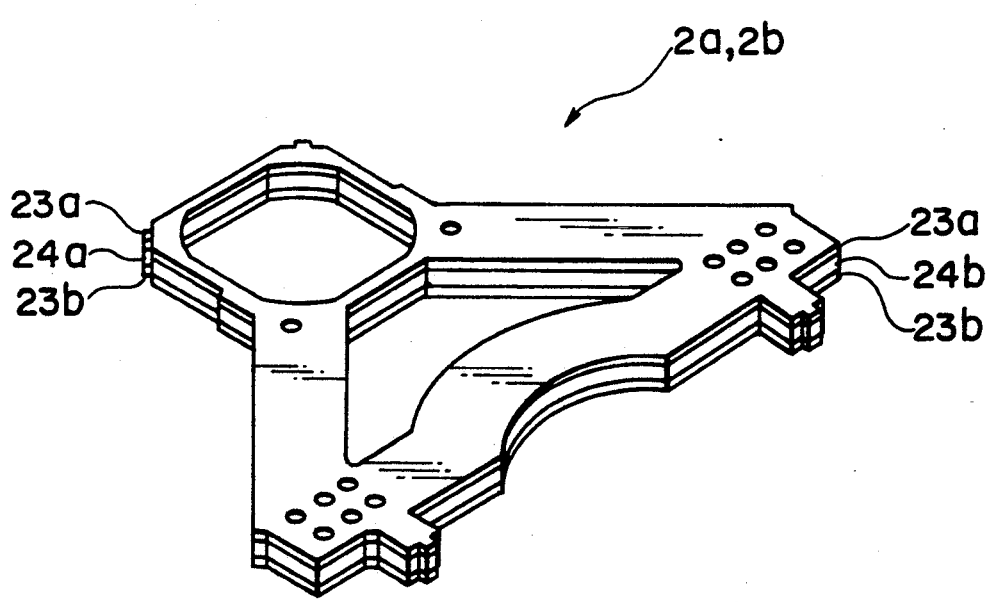
FIG. 7 is a perspective view showing a variation of the leaf spring unit which forms the leaf spring mechanism shown in FIG. 6.

The method of making the leaf spring systems which has been described referring to FIGS. 21 through 25 relates to the leaf spring system shown in FIG. 11 but this method can be applied to the leaf spring units 2a and 2b shown in FIGS. 6 and 7 and also to the leaf spring mechanism 5 which is formed by the leaf spring units 2a and 2b. The reinforcing sheet segment 51a has been shaped like a rectangle but it may be shaped like an arc and the reinforcing portions 65 and 66 may be shaped corresponding to the pinch system.

According to the present invention, the thicknesses of the leaf spring and the reinforcing plate and material by which they are made may be selected as desired. In addition, the parallel leaf spring system used for the objective lens drive device can be applied to other devices.

According to the present invention as described above, there can be provided an objective lens drive apparatus wherein the leaf springs can be made keeping their parallel orientation accurate and the objective lens can be driven in the radial direction without losing the parallel orientation of the leaf springs.

Obviously, numerous modifications and variations of the present invention are possible in light of the above teachings. It is therefore to be understood that within the scope of the appended claims, the invention may be practiced otherwise than as specifically described herein.

What is claimed is:

1. A method of making a leaf spring assembly which comprises:
    providing a first leaf spring sheet including a first thin leaf spring having a first and second end and a first extending portion connected to the first and second ends of the first thin leaf spring;

providing a second leaf spring sheet including a second thin leaf spring having a first and second end and an extending portion connected to the first and second ends of the second thin leaf spring; and pinching the first and the second extending portions so as to hold the first and the second leaf springs parallel to each other and molding the first and second ends of the first and second leaf springs.

2. The method according to claim 1, wherein each of the first and the second leaf springs is shaped substantially like a rectangle.

3. The method according to claim 1, wherein each of the first and second leaf springs is shaped substantially like a triangle which has an extended apex portion.

4. The method according to claim 1, which comprises:

providing a first reinforcing sheet having first and second reinforcing portions shaped to correspond to the first and second ends of the first leaf spring and a third reinforcing portion shaped to correspond to the first extending portion;

welding the first reinforcing sheet to the first leaf spring sheet;

providing a second reinforcing sheet having fourth and fifth reinforcing portions shaped to correspond to the first and second ends of the second leaf spring and a sixth reinforcing portion shaped to correspond to the second extending portion; and welding the second reinforcing sheet to the second leaf spring sheet.

5. The method according to claim 4, which comprises:

providing a third leaf spring sheet including a third thin leaf spring having a first and second end and a third extending portion connected to the first and second ends of the third leaf spring;

forming a first leaf spring arrangement in such a way that the third leaf spring sheet is welded to the first reinforcing sheet and that the third leaf spring sheet is welded to the first leaf spring sheet through the first reinforcing sheet;

providing a fourth leaf spring sheet including a fourth thin leaf spring having a first and second end and an extending portion connected to the first and second ends of the fourth thin leaf spring; and forming a second leaf spring arrangement such that the fourth leaf spring sheet is welded to the second reinforcing sheet and that the fourth leaf spring is welded to the second leaf spring sheet through the second reinforcing sheet.

6. The method according to claim 4, which comprises maintaining the first and second leaf spring arrangements substantially parallel to each other and pinching and molding those portions of the first and the second leaf spring arrangement which are welded.

* * * * *